United States Patent
Royo Royo et al.

(10) Patent No.: US 9,726,474 B2
(45) Date of Patent: Aug. 8, 2017

(54) METHOD OF MEASURING A CHANGE IN AN OPTICAL PATH LENGTH USING DIFFERENTIAL LASER SELF-MIXING INTERFEROMETRY AND A DIFFERENTIAL LASER SELF-MIXING INTERFEROMETRY MEASURING SYSTEM

(71) Applicant: UNIVERSITAT POLITÈCNICA DE CATALUNYA, Barcelona (ES)

(72) Inventors: Santiago Royo Royo, Castellbisbal (ES); Francisco Javier Azcona Guerro, Terrassa (ES); Ajit Jha, Terrassa (ES)

(73) Assignee: UNIVERSITAT POLITECNICA DE CATALUNYA, Barcelona (ES)

( * ) Notice: Subject to any disclaimer, the term of this patent is extended or adjusted under 35 U.S.C. 154(b) by 0 days.

(21) Appl. No.: 15/104,952

(22) PCT Filed: Oct. 15, 2014

(86) PCT No.: PCT/IB2014/002119
§ 371 (c)(1),
(2) Date: Jun. 15, 2016

(87) PCT Pub. No.: WO2015/092498
PCT Pub. Date: Jun. 25, 2015

(65) Prior Publication Data
US 2016/0320173 A1    Nov. 3, 2016

(30) Foreign Application Priority Data
Dec. 17, 2013 (ES) .................................... 13005853

(51) Int. Cl.
*G01B 9/02* (2006.01)
*G01S 17/32* (2006.01)
(Continued)

(52) U.S. Cl.
CPC ..... *G01B 9/02092* (2013.01); *G01B 9/02004* (2013.01); *G01B 9/0207* (2013.01);
(Continued)

(58) Field of Classification Search
CPC ............ G01B 9/02004; G01B 9/02092; G01B 9/02097; G01B 11/026
See application file for complete search history.

(56) References Cited

U.S. PATENT DOCUMENTS

2010/0321668 A1* 12/2010 Ueno ...................... G01P 3/366
356/4.01
2014/0368832 A1* 12/2014 Salvade ................. G01B 5/008
356/497

FOREIGN PATENT DOCUMENTS

WO     WO 2012/049561 A1    4/2012
WO     WO 2015/092498 A1    6/2015

OTHER PUBLICATIONS

R. Lang and K. Kobayashi, External optical feedback effects on semiconductor injection laser properties, IEEE Journal of Quantum Electronics, vol. 16, pp. 347-355, Mar. 1980.
(Continued)

*Primary Examiner* — Jonathan Hansen
(74) *Attorney, Agent, or Firm* — Robert J. Hess; Hess Patent Law Firm

(57) ABSTRACT

A method and system to implement the method of measuring a change in an optical path length using differential laser self-mixing interferometry. The method includes obtaining a reference SMI signal (Sr) and a main measurement SMI signal (Sm) of a laser (LD) and determining the relative change in the optical path length between the (LD) and a target (T) in a range between 0 and λ/2, by comparing the relative positions along time of fringes or transitions of the (Sm) and (Sr). The (Sr) and the (Sm) are obtained at different moments once backscattered laser light (br) is generated
(Continued)

from the reflection on said target (T) of a reference and a main measurement laser light beam emitted by the laser (LD) and while being modulated according to a specific modulation pattern that maintained while both the (Sr) and the (Sm) are acquired and has re-entered its laser cavity.

20 Claims, 8 Drawing Sheets

(51) Int. Cl.
    *G01S 17/58*     (2006.01)
    *G01B 11/02*     (2006.01)
    *G01S 7/491*     (2006.01)

(52) U.S. Cl.
    CPC .......... *G01B 11/026* (2013.01); *G01S 7/4916* (2013.01); *G01S 17/32* (2013.01); *G01S 17/58* (2013.01)

(56) References Cited

OTHER PUBLICATIONS

W. M. Wang, W. J. O. Boyle, K. T. V. Grattan, and A. W. Palmer, "Self-mixing interference in a diode laser: experimental observation and theoretical analysis," Applied Optics,vol. 32, pp. 1551-1558, Mar. 1993.

S. Donati, Responsivity and noise of self-mixing photodetection schemes, IEEE Journal of Quantum Electronics, vol. 47, No. 11, pp. 1428-1433, 2011.

R. W. Tkach and A. R. Chraplyvy, Regimes of feedback effects in 1.5 m distributed feedback lasers, Journal of Lightwave Technology, vol. 4, pp. 1655-1661, Nov. 1986.

G. Giuliani and S. Donati, Laser interferometry, in Unlocking dynamical diversity (D. M. Kane and K. A. Shore, eds.), ch. 7, pp. 217-253, Wiley 1 ed. 2005.

U. Zabit, F. Boni, T. Bosch, and A. D. Rakic, A self-mixing displacement sensor with fringe-loss compensation for harmonic vibrations, IEEE Photonics Technology Letters, vol. 22, pp. 410-412, Mar. 2010.

S. Donati, "Developing self-mixing interferometry for instrumentation and measurements," Laser Photonics Review,vol. 6,Issue 3, p. 393-417, May 2012.

M. Norgia, G. Giuliani and S. Donati, Absolute distance measurement with improved accuracy using laser diode self-mixing interferometry in a closed loop, IEEE Transactions on Instrumentation and Measurement, vol. 56, pp. 1894-1900, Oct. 2007.

M. Norgia et al., "High resolution self-mixing laser rangefinder", Review of Scientific Instruments, AIP, Melville, NY, vol. 83, No. 4, Apr. 16, 2012 pp. 45113-45113.

K. Petermann, Laser Diode Modulation and Noise. Springer, 1988.

E. Gagnon and J.-F. Rivest, Laser range imaging using self-mixing effect in a laser diode, IEEE Transactions on Instrumentation and Measurement, vol. 48, pp. 693-699, Jun. 1999.

\* cited by examiner

METHOD OF MEASURING A CHANGE IN AN OPTICAL PATH LENGTH USING DIFFERENTIAL LASER SELF-MIXING INTERFEROMETRY AND A DIFFERENTIAL LASER SELF-MIXING INTERFEROMETRY MEASURING SYSTEM

FIELD OF THE INVENTION

The present invention generally relates, in a first aspect, to a method of measuring a change in an optical path using differential laser self-mixing interferometry, comprising a reference interferometric signal and a main measurement signal, and more particularly to a method where said reference and said main self-mixing interferometric signal is obtained on the measuring laser.

A second aspect of the invention relates to a differential laser self-mixing interferometry measuring system adapted to implement the method of the first aspect.

BACKGROUND OF THE INVENTION

Self-mixing interferometry (SMI), also known as optical feedback interferometry (OFI), is a well characterized method capable of measuring displacement related phenomena. The SMI effect was first observed in the decade of 1960, although it was then disregarded and considered as a nuisance for the development of laser based communications. Later, in the early 1980's, the interest of characterizing the behaviour of laser diodes (LD) gave rise to some of the early studies that can be related to the SMI method. Of those studies, probably the most representative is the study performed by Lang and Kobayashi [1]. The study describes and tests a mathematical model for a single-mode LD subject to feedback and the appearance of a modulation in the LD optical output power (OOP) related to the amount of feedback level. Later work on the subject proposed other models such as the double Fabry-Perot cavity [2] with a single reflection in the second cavity to account for the modulation produced over the OOP.

In short, SMI can be defined as the modulation of a LD-OOP caused when part of the laser light emitted (be1) is backscattered (br1) from the target (T) and re-enters the LD cavity, as shown in FIG. 1, interfering with the standing wave in the cavity. The changes in the OOP are then monitored either by an internal monitor photo-diode (PD), typically located at the back-facet of the LD electronic package, or by directly measuring voltage changes over the LD junction. Each of the schemes can show advantages and disadvantages as described in [3].

Mathematically, the SMI effect can be described by the following three equations:

$$\Delta\phi = (\phi_F - \phi_0)\tau + C\sin(\phi_F\tau + a\tan\alpha), \quad (1)$$

$$P_F = P_0[1 + mF(\phi)], \quad (2)$$

$$F(\phi) = \cos(\phi_F\tau), \quad (3)$$

where $\Delta\phi$ is the change of the LD phase due to the feedback, $\phi_0$ the initial LD phase, $\phi_F$ the phase after feedback, C the feedback level factor, $\alpha$ the linewidth enhancement factor, $P_F$ the optical output power after feedback, $P_0$ the original LD output power and m the modulation factor.

In practice, the C factor shown in Eq. (1) has one of the most critical roles on the SMI signal interpretation, since it "controls" the shape of the signal and its suitability to perform accurate measurements. As discussed on [4] and [5], the value of C influences the SMI signal shape as follows:

If C<0.1: The SMI signal behaves in a purely sinusoidal fashion, and typically has small amplitudes. This is named the very weak feedback regime.

If 0.1<C<1: The SMI signal increases its amplitude and as C approaches to 1 the SMI signal acquires a sawtooth-like shape. This is named the weak feedback regime.

If C>1: The SMI signal has a sawtooth-like shape due to Hopf-bifurcation processes. As C increases, hysteresis appears and fringe loss situations can be expected. This is named the moderate feedback regime.

For large C values, the signal becomes chaotic and it cannot be used for measurement applications. This is named the coherence collapse regime.

Thus, it is usually preferred to work within the weak (0.1<C<1) regime and close to the boundaries of moderate regime (C~1) to avoid fringe-loss and keep a signal-to-noise ratio (SNR) higher than 10 dB, therefore simplifying the detection work and acquiring all the information that can be obtained from the SMI signal.

For the purpose of clarity, on further practical and theoretical descriptions presented on this specification it is considered that the LD used is a FP single-mode laser. Other types of lasers and LDs such as vertical cavity surface emitting lasers (VCSEL) and distributed feedback lasers (DFB) have already been tested and documented as suitable for SMI interferometry. Multi-mode lasers can also be applied for SMI, however the appearance of multiple harmonics in the sub-bands can enhance the difficulty of the signal processing. Two implementations of SMI using the method and system proposed by the present invention are discussed in a posterior section of the present specification since they may be applied using the differential self-mixing interferometry (DSMI) technique, namely the so-called "amplitude modulation embodiment" and the "current modulation embodiment."

A differential self-mixing interferometry, or differential optical feedback interferometry (DOFI) method and system was proposed by the inventors in [6], as a solution to increase the SMI measurement resolution by comparing or operating two interferometric signals: the main measurement one generated by a first laser aiming to a target, and a reference SMI signal generated by another laser aiming the first laser or its mechanical holder while the first laser is moving.

Although the proposal made in [6] improved the resolution in comparison with the conventional SMI technique and enabled measuring very small features, it still has some drawbacks, such as the need of a second laser and its associated circuitry (such as a second amplification circuit and analogue-digital converter), which increases the cost of the final system and also the complexity of the operation thereof, as both lasers must perform as identically as possible to obtain the best results.

No considerations regarding the precision attainable in amplitude resolution are detailed in [6], where only some relationship between the phase and the measured displacement is established. Furthermore, the system in [6] requires a double-laser approach which, as stated above, implies a larger cost, more complex circuitry and processing, as far as the participation of two different lasers pushes up the requirements in order to ensure identical optical (wavelength, feedback level) and electronic (amplification circuitry, photodiode response) performances, and subsequently longer and more complex signal processing procedures. Such equivalence of the two lasers is impossible to attain in practical experimental configurations. Each difference in any parameter affecting the SMI signal reduces the accuracy of the technique as the reference and measurement signals will present small deviations from each other.

Finally, both references [10] and [8] disclose respective interferometric methods for measuring the optical path itself, i.e. to perform an absolute distance measurement, as any other known interferometric method (with the exception of the one described in [6]).

The methods presented on [10] and [8] consist on recovering the SMI signals from an electronically modulated laser and then estimating the absolute distance by relating the laser parameters. In order to perform that measurement, the target should be static during the signal acquisition.

No determination of the relative change in the optical path length between a laser and a target is disclosed at all in [10] nor in [8]. Obviously, such a relative change in the optical path length has nothing to do with a displacement measurement performed by a simple subtraction between the measurements of two absolute distances (not even such a simple subtraction measurement is disclosed in [10] nor in [8]).

Such a simple subtraction of absolute distances using SMI would not suffice to recover a displacement with a resolution comprised in a range between 0 and $\lambda/2$.

Furthermore, the caption of FIG. 9 in [10] mentions: "Mean and STD of measured distance as a function of target position in steps of 500 µm, Y axis corresponds to the absolute distance and X axis to the displacement". Therefore, [10] defines displacement only as the difference between two static distances, not referring to the displacement of a target that is in motion during the measurement itself.

The resolution proposed by [10] and [8] is at least 5 orders of magnitude below said range between 0 and $\lambda/2$.

It is also important to keep in mind the differences between distance and displacement. Distance is a non-zero quantity that is equal to the total length of path from laser to target, therefore not containing any frequency or directional attribute. Displacement is a vectorial quantity that in magnitude only contains the differences in length, but also includes frequency and directional attributes.

It must also be pointed out that none of [10] and [8] disclose the use of a mechanical modulation, obviously because a mechanical modulation method has no capabilities of estimating the total absolute distance to the target, which is the goal of both [10] and [8].

REFERENCES

[1] R. Lang and K. Kobayashi, "External optical feedback effects on semiconductor injection laser properties," IEEE Journal of Quantum Electronics, vol. 16, pp. 347-355, March 1980.
[2] W. M. Wang, W. J. O. Boyle, K. T. V. Grattan, and A. W. Palmer, "Self-mixing interference in a diode laser: experimental observation and theoretical analysis," Applied Optics, vol. 32, pp. 1551-1558, March 1993.
[3] S. Donati, "Responsivity and noise of self-mixing photodetection schemes," IEEE Journal of Quantum Electronics, vol. 47, no. 11, pp. 1428-1433, 2011.
[4] R. W. Tkach and A. R. Chraplyvy, "Regimes of feedback effects in 1.5 µm distributed feedback lasers," Journal of Lightwave Technology, vol. 4, pp. 1655-1661, November 1986.
[5] G. Giuliani and S. Donati, "Laser interferometry," in Unlocking dynamical diversity (D. M. Kane and K. A. Shore, eds.), ch. 7, pp. 217-253, Wiley, 1 ed., 2005.
[6] S. Royo, R. Atashkhooei, and F. J. Azcona, "A method of measuring a displacement related parameter using a laser self-mixing measuring system and a laser self-mixing measuring system." WO 2012/049561, 2012.
[7] U. Zabit, F. Boni, T. Bosch, and A. D. Rakic, "A self-mixing displacement sensor with fringe-loss compensation for harmonic vibrations," IEEE Photonics Technology Letters, vol. 22, pp. 410-412, March 2010.
[8] S. Donati, "Developing self-mixing interferometry for instrumentation and measurements," Laser Photonics Review, vol. 6, Issue 3, pages 393-417, May 2012
[9] M. Norgia, G. Giuliani, and S. Donati, "Absolute distance measurement with improved accuracy using laser diode self-mixing interferometry in a closed loop," IEEE Transactions on Instrumentation and Measurement, vol. 56, pp. 1894-1900, October 2007.
[10] Norgia M. et al, "High resolution self-mixing laser rangefinder", Review of Scientific Instruments, vol. 83, no. 4, pp. 045113-1-045113-6, 2012.
[11] K. Petermann, Laser Diode Modulation and Noise. Springer, 1988.
[12] E. Gagnon and J.-F. Rivest, "Laser range imaging using self-mixing effect in a laser diode," IEEE Transactions on Instrumentation and Measurement, vol. 48, pp. 693-699, June 1999.

DESCRIPTION OF THE INVENTION

It is an object of the present invention to offer an alternative to the prior state of the art, with the purpose of providing a method and a system which overcomes the above mentioned drawbacks and lacks of the method and system of [6], offering more advantageous manners and configurations for acquiring the reference SMI signal to be compared with the main measurement SMI signal.

To that end, the present invention relates, in a first aspect, to a method of measuring a change in an optical path length, typically a displacement-related parameter, using differential laser self-mixing interferometry, the method comprising the steps of:

obtaining a reference self-mixing interferometric signal of a laser having a laser cavity;

obtaining a main measurement self-mixing interferometric signal of said laser, once backscattered laser light has re-entered said laser cavity, said backscattered laser light being generated at the target of a main measurement laser beam emitted by said laser while is being modulated according to a specific modulation pattern; and determining the relative change in the optical path length between said laser and said target comprised in a range between 0 and $\lambda/2$, typically in the form of relative motion and/or relative velocity of said target with respect to said laser, by comparing the relative positions along time of fringes or transitions of said main and reference interferometric signals.

Contrary to the known method disclosed in [6], in the method of the first aspect of the present invention said reference self-mixing signal is obtained on said laser at a different moment than said main measurement self-mixing signal, particularly once backscattered laser light, generated from the reflection on said target of a reference laser light beam emitted by said laser while maintaining said specific modulation pattern while both the main measurement self-mixing interferometric signal and the reference self-mixing interferometric signal are acquired, has re-entered said laser cavity, thus reducing, in comparison with the method of [6], the elements in the setup to a single laser diode and its associated circuitry. Both reference and main measurement signals are thus obtained at different moments, being irrelevant whichever is obtained in the first moment.

Said relative change of optical path length is due, generally, to a random displacement perturbation of the target, although for other embodiments the relative change in the optical path can also be due (additionally or alternatively) to a change in the refractive index of the optical path, as the person skilled in the art knows. In a following section, a more detailed explanation of how an optical path length can change will be given.

Obviously, the determination of the relative change in the optical path length has nothing to do with a simple subtraction between the measurements of two absolute distances. No comparison of the values of two complete optical paths (distances) is performed at all by the method of the first aspect of the present invention. In all cases, the above mentioned comparison is performed prior to the reconstruction of the self-mixing interferometric signals.

It must also be pointed out that, contrary to the proposals related to absolute distance measurements (such as those of [10] and [8]), which require a static target, for the method of the first aspect of the present invention that requirement is not needed, i.e. the method works with a static target, i.e. a target which does not suffer of any movement, but also with a fixed target, understood as a target which keeps its average position or equilibrium position while undergoing a known vibration, as will be disclosed below for different embodiments.

Said displacement-related parameter generally contains magnitude, frequency and directional attributes, and the optical path length relative change is determined in the form of a vector containing said magnitude, frequency and directional attributes.

For an embodiment:
said main measurement self-mixing interferometric signal includes a defined number of fringes for a measurement time window, and said specific modulation pattern is maintained during said emission of said reference laser beam such that the reference measurement self-mixing interferometric signal includes, for a time window with the same duration than said measurement time window, the same defined number of fringes than the self-mixing interferometric signal but, at least some of them, shifted with respect thereto, and wherein said comparison of the relative positions of the fringes or transitions of the main and reference self-mixing interferometric signals includes at least a comparison between the positions, in their respective time windows, of at least some of the fringes of both of said main and reference self-mixing interferometric signals.

This reduction of elements presents at least the next main advantages: a reduction in the number of electronic channels required for acquisition (relaxing the ADC requirements of the related circuitry); a reduction on the number of electronic conditioning cards (reducing power consumption, amount of electronic components and reducing the variability due to difference in components); and a reduction and simplification in the signal processing procedures required to account for the dissimilarities in the signals in the reference and main measurement signal, yielding a measurement which is more accurate and faster with a simpler and cheaper setup.

For an embodiment, called in the present specification as "amplitude modulation embodiment", the above mentioned specific modulation pattern is a mechanical amplitude modulation provided by applying a specific and controlled relative physical displacement, where displacement is to be understood as the act of displacing, between the laser and the target to produce said specific modulation pattern.

In other words, for said "amplitude modulation embodiment", the method of the first aspect of the invention comprises, in order to obtain said reference and measurement self-mixing signals, applying a relative physical displacement between said laser and said target and, while maintaining said relative physical displacement, emitting, with said laser, a reference laser light beam onto said target and obtaining the reference self-mixing interferometric signal of the laser once backscattered laser light, generated from the reflection on the target of said reference laser light beam, has re-entered the laser cavity of the laser. An equivalent process is used at a different moment to acquire the main measurement self-mixing interferometric signal. When obtaining the reference self-mixing signal the target may be static, in a preferred embodiment, or undergoing a known trajectory. In a different moment, the main measurement self-mixing signal is obtained in the same manner as the reference signal, while pointing at the target whose motion wants to be measured while it is undergoing a random displacement perturbance.

For said "amplitude modulation embodiment", the above mentioned defined number of fringes are proportional to the amplitude of the mechanical amplitude modulation, the latter being larger than $\lambda/2$.

Said relative physical displacement of said mechanical amplitude modulation is performed, according to a variant of said "amplitude modulation embodiment", along a time extent following a ramp-like or triangular path, although other kind of displacement paths can be used, in a less preferred manner, such as a sinusoidal path.

Said displacement-related parameter is, for an embodiment, said relative motion and/or relative velocity of said target which is undergoing a random displacement perturbance when obtaining the main measurement self-mixing interferometric signal.

At this point, it is important to separate the concepts of target displacement and mechanical modulation. Both produce a change in OPL (Optical Path Length), but according to the present invention, when target displacement is mentioned it has to be understood as making reference to any displacement, vibration, etc. which the target might suffer in a random fashion. Mechanical modulation, instead, refers to a mechanical motion induced on the laser to produce a defined pattern of SMI fringes which are the means for the comparison of signals used in the technique. Therefore, the mechanical modulation is kept throughout the measurement (along the acquisition of the reference and measurement self-mixing signals), while the target displacement acts randomly, therefore being capable of direction changes as well as of amplitude changes.

For another embodiment, called in the present specification as "current modulation embodiment", or current modulated DSMI, and which is alternative to the above mentioned embodiment referred to as "amplitude modulation embodiment", the above mentioned modulation is a current modulation which comprises providing to the laser a driving current signal which is modulated in time to produce said specific modulation pattern In other words, for said "current modulation embodiment", the method of the first aspect of the invention comprises, in order to obtain said reference and main measurement self-mixing signals, providing to said laser a driving current signal which is not constant but undergoing a periodic modulation with time. Such modulation in the driving current of the laser diode produces a change in the wavelength of the laser which produces a different type of self-mixing signal. Said driving current signal enables to shine a reference beam onto said target, and to obtain the reference self-mixing interferometric signal of the laser once backscattered laser light, generated from the reflection on the target of said reference laser light beam, has re-entered the laser cavity of the laser when pointing at the same target, which for this reference case is stationary or undergoing a known displacement. The same driving current signal enables to obtain, in a different moment, a main measurement self-mixing signal when pointing at said target, which is undergoing a perturbance which wants to be determined.

For said "current modulation embodiment", the above mentioned defined number of fringes are a function of the absolute distance to the target, where said absolute distance to the target is larger than the resolution of the current modulation, said modulation also comprising, if needed, adjusting said absolute distance to the target to produce said defined number of fringes.

In said "current modulation embodiment" the change of phase for obtaining the fringes is obtained using an electrical modulation instead of the mechanical modulation of the "amplitude modulation embodiment", thus increasing the attainable acquisition rate which becomes non-limited by mechanical effects, like couplings or friction, which lead to limits in the maximum attainable frequency of the amplitude modulation embodiment.

Said driving current signal is, according to a variant of said "modulation by current method embodiment", a current signal modulated in time as a triangular wave, and said displacement-related parameter is said random displacement perturbance suffered by the target, the method of the first aspect of the present invention allowing to measure relative distances below $\lambda/2$.

Generally, the above mentioned main and reference self-mixing interferometric signals are optical output power signals, or signals generated therefrom or related thereto (such as voltage laser junction signals, threshold current, lasing spectrum or bandwidth).

For an embodiment of the method of the first aspect of the invention, the reference self-mixing interferometric signal is obtained for a static target, understood as a target which does not suffer of any movement or a displacement that is below the resolution of the measurement of the relative change in the optical path length.

For an alternative embodiment, the reference self-mixing interferometric signal is obtained for a target which is undergoing a known displacement but keeps its average position or equilibrium position.

According to a further embodiment of the method of the first aspect of the invention, the main measurement self-mixing interferometric signal is a first main measurement self-mixing interferometric signal, the method comprising, after obtaining said first main measurement self-mixing interferometric signal:
  obtaining at least a second main measurement self-mixing interferometric signal including the same defined number of fringes for a second measurement time window with the same duration than said measurement time window, and
  performing said determining of the relative change in the optical path length between the laser and the target, by comparing the positions, in their respective time windows, of at least some of the fringes of all of the main self-mixing interferometric signals with at least some of the fringes of the reference self-mixing interferometric signal.

As will be explained in more detail in a following section, in order to obtain the reference self-mixing interferometric signal from a fixed target, for the "amplitude modulation embodiment" a mechanically induced path change that produces a defined number of fringes which is proportional to the amplitude of the mechanical modulation is performed, while for the "current modulation embodiment", a current modulation of the laser which produces a change of the laser wavelength and produces a number of fringes as a function of the absolute distance to the target is performed.

Once the reference self-mixing interferometric signal is obtained, it is generally stored for future comparison with the main self-mixing interferometric signal. During the measurement (acquisition of the main self-mixing interferometric signal), the same path change produced by the mechanical modulation or the current modulation is registered including any perturbation in an order lower than $\lambda/2$ that the target suffers (therefore, the target is not static during the measurement and/or the refractive index of the optical path varies during the measurement). This results in the same number of fringes in the main self-mixing interferometric signal, thus, allowing a direct comparison between consecutive fringe intervals.

In order to process the signals, for an embodiment, the time occurrence of the fringes in the main and the reference self-mixing interferometric signals, as well as the time intervals in each signal, are first calculated. By definition each interval can be defined as a change in phase of $\pi$ which can be equated to a displacement of $\lambda/2$. By taking the ratio of the time intervals is then possible to calculate the local displacement during that interval.

According to the present invention, the mechanical modulation embodiment and the current modulation embodiment are equivalent in concept since both of them require a reference signal caused either by a mechanical modulation or a current modulation which then has small change in each fringe position because of the target displacement.

Moreover, as will described in more detail in a following section, any target movement (or change in the refractive index of the optical path) will result in a difference only in the fringe position of the fringes of both interferometric signals, but not in the main form of the signals.

It is also important to notice that the path difference can only be modulated by physical motion, this is, in the mechanical modulation, and not by current modulation where the changes which create the signal are induced by the change in wavelength introduced by the current.

A second aspect of the invention concerns to a differential laser self-mixing interferometry measuring system comprising:
  a laser having a laser cavity and arranged for emitting, when a main driving current signal is applied thereto, a main measurement light beam onto a target, while is being modulated according to a specific modulation pattern, and for receiving, re-entering said laser cavity, backscattered laser light from said target of said main measurement laser light beam;
  detection means arranged for detecting a main measurement self-mixing interferometric signal of said laser resulting from the re-entering of said backscattered laser light into the laser cavity;

means for obtaining a reference self-mixing interferometric signal; and measuring means for determining the relative change in the optical path length between said laser and said target comprised in a range between 0 and $\lambda/2$, typically in the form of relative motion and/or relative velocity of said target with respect to said laser, by comparing the relative positions along time of fringes or transitions of said main and reference interferometric signals.

Contrary to the known system disclosed in [6], in the system of the second aspect of the present invention the main measurement and reference self-mixing signals are obtained in different moments in time and using a single laser. Thus, said means for obtaining said reference and main measurement self-mixing interferometric signals are constituted by said detection means, which are configured and arranged for detecting said reference self-mixing interferometric signal on said laser and at different moment than the main measurement self-mixing interferometric signal once backscattered laser light, generated from the reflection on the target of a reference laser light beam emitted by the laser while maintaining said specific modulation pattern, has re-entered said laser cavity, thus reducing, in comparison with the system of [6], the setup elements to a single laser, hence having the same main advantages already indicated above regarding the method of the first aspect of the invention associated to said reduction.

For a preferred embodiment, said laser is the only laser included in the system.

For an embodiment, the system of the second aspect of the invention comprises modulation means for performing said modulation of said laser according to said specific modulation pattern.

Said modulation means are configured and arranged for maintaining said specific modulation pattern during the acquisition, by means of the detection means, of both the main measurement and the reference self-mixing interferometric signals, such that both of said signals include the same defined number of fringes during respective time windows.

For another embodiment, the system comprises a plurality of the above indicated elements (laser, detection means and measuring means) working as explained above, for determining the relative change in optical path, in particular motion and/or relative velocity of a plurality of targets and/or of the same targets (for example for performing redundancy measures), where each laser performs the above explained double function of acquiring a main SMI signal and a reference SMI signal.

For an embodiment, also called in the present specification as "amplitude modulation embodiment" or "mechanical modulation embodiment", said modulation means comprise displacement means for performing a mechanical amplitude modulation by applying a specific relative physical displacement between said laser and said target, where displacement is to be understood as the act of displacing, and control means controlling said laser to make it emit said reference and said measurement laser light beam onto said target while said specific relative physical displacement is maintained.

In other words, for said "amplitude modulation embodiment", the system of the second aspect of the invention comprises displacement means for applying a relative physical displacement between said laser and said target, and control means controlling said laser to make it emit a reference and measurement laser light beams onto said target while said relative physical displacement is maintained, in order to be reflected thereon and generate backscattered laser light which re-enters the laser cavity of the laser generating said reference self-mixing interferometric signal. When obtaining the reference self-mixing signal the target may be static in a preferred embodiment, or undergoing a known trajectory. In a different moment, the main measurement self-mixing signal is obtained in the same manner as the reference signal, while pointing at the target whose motion wants to be measured while it is undergoing a perturbance which wants to be determined.

For a variant of said "amplitude modulation embodiment", in the system of the second aspect of the invention said displacement means comprise a moveable support onto which the laser is mounted.

The system further comprises, for an embodiment, a driving mechanism including at least one electrically excited vibrating element fixed or at least in contact with said support, and electronic means supplying said vibrating element with electrical signals predetermined for making it vibrate according to said specific relative physical displacement performed along a time extent following a ramp-like or triangular path.

According to another embodiment, also called in the present specification as "current modulation embodiment" and which is alternative to the above mentioned embodiment referred as "amplitude modulation embodiment", said modulation means comprise driving current means for providing to said laser a driving current signal which is modulated in time to produce said specific modulation pattern.

In other words, for said "current modulation embodiment", the system of the second aspect of the invention comprises, in order to obtain said reference and main measurement self-mixing signals, providing to said laser in both cases a driving current signal which is not constant but undergoing a modulation with time. Such modulation in the driving current of the laser diode produces a change in the emitted wavelength of the laser which produces a different type of self-mixing signal. Said driving current signal enables to shine, at different moments, a reference and a main measurement laser beams onto said target, and to obtain the reference and measurement self-mixing interferometric signals of the laser once backscattered laser light, generated from the reflection on the target of, respectively, said reference and said main measurement laser light beams, has re-entered the laser cavity of the laser when pointing at the same target, which for this reference case is stationary or undergoing a known displacement. Thus, the same driving current signal enables to obtain the reference SMI signal and, in a different moment, the main SMI signal, the latter when pointing at a target which is undergoing a perturbance which wants to be determined.

For said "current modulation embodiment", said modulation means also comprises, for an embodiment, distance adjusting means for adjusting the absolute distance to the target to produce said defined number of fringes.

For an embodiment, the system of the second aspect of the invention comprises memory means for storing said reference and/or main measurement self-mixing interferometric signals, said memory means being accessible by said measuring means.

Amplitude modulated DSMI and current modulated DSMI are two main embodiments of the method and system of the present invention proposed for the measurement of perturbances at the target with changes in optical path between the laser and the target comprised in a range between 0 and $\lambda/2$, with a resolution in the order of a few nanometers. These main embodiments have in common that both require the acquisition of a reference SMI signal, which is used as a mean for the proposed spatial comparison with a main measurement signal acquired in a different moment in time.

In a posterior section, the theoretical analysis of the resolution in amplitude measurements of the DSMI technique for both proposed configurations will be described in detail, including the development of equations thereof valid for both of said main embodiment.

BRIEF DESCRIPTION OF THE DRAWINGS

The previous and other advantages and features will be better understood from the following detailed description of embodiments, with reference to the attached drawings, which must be considered in an illustrative and non-limiting manner, in which.

DETAILED DESCRIPTION OF SEVERAL EMBODIMENTS

Figure 3:
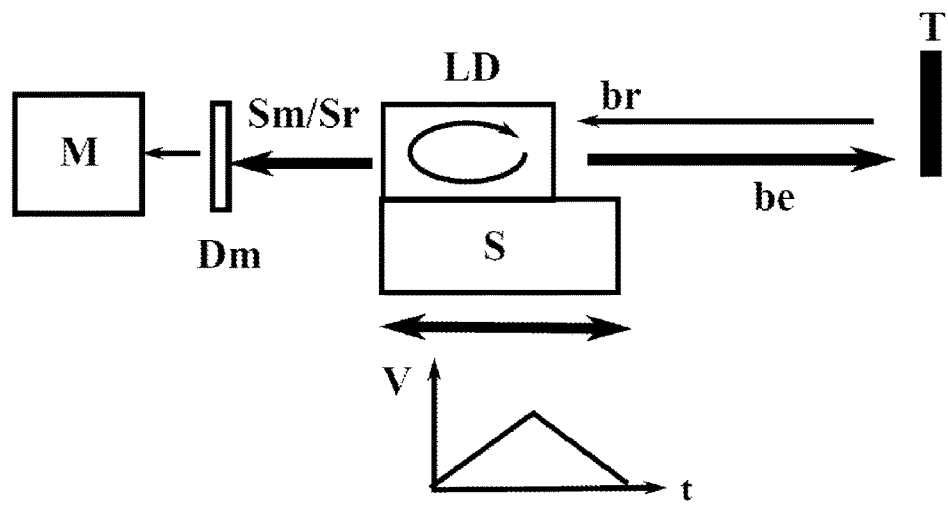
FIG. 3 schematically shows the amplitude modulation DSMI configuration, according to a main embodiment of the system of the second aspect of the invention. A time-changing amplitude modulation V is applied to the mechanical displacement means S, and is used for obtaining the reference and the main measurement signals in different moments in time.
Figure 10:
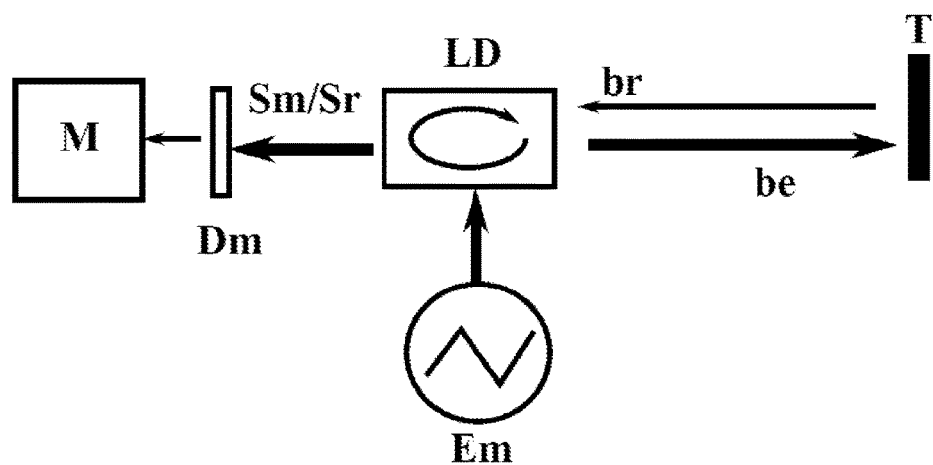
FIG. 10 shows the current modulated DSMI configuration, according to another main embodiment of the system of the second aspect of the invention. A time-changing current modulation Em is applied to the laser LD, and is used for obtaining the reference and the main measurement signals in different moments in time.

FIGS. 3 and 10 schematically depict the system of the second aspect of the invention, for, respectively, the "amplitude modulation embodiment", also called "mechanical modulation embodiment", and the "current modulation embodiment", where the system comprises for both embodiments:

a single laser LD having a laser cavity and arranged for emitting a main measurement light beam be onto a target T and for receiving, re-entering said laser cavity, backscattered laser light br generated from the reflection on said target T of said main measurement laser light beam be;

detection means Dm arranged for detecting a main measurement self-mixing signal Sm of said single laser LD resulting from the re-entering of said backscattered laser light br into the laser cavity, and also for detecting a reference self-mixing signal Sr on said single laser LD and at a different moment than said main measurement self-mixing signal Sm; and measuring means M for determining the relative change in optical path, which in general is related to the relative motion and/or relative velocity and/or relative distance of said target T, with respect to said laser LD, by comparing said main Sm and reference Sr interferometric signals.

Figure 4:
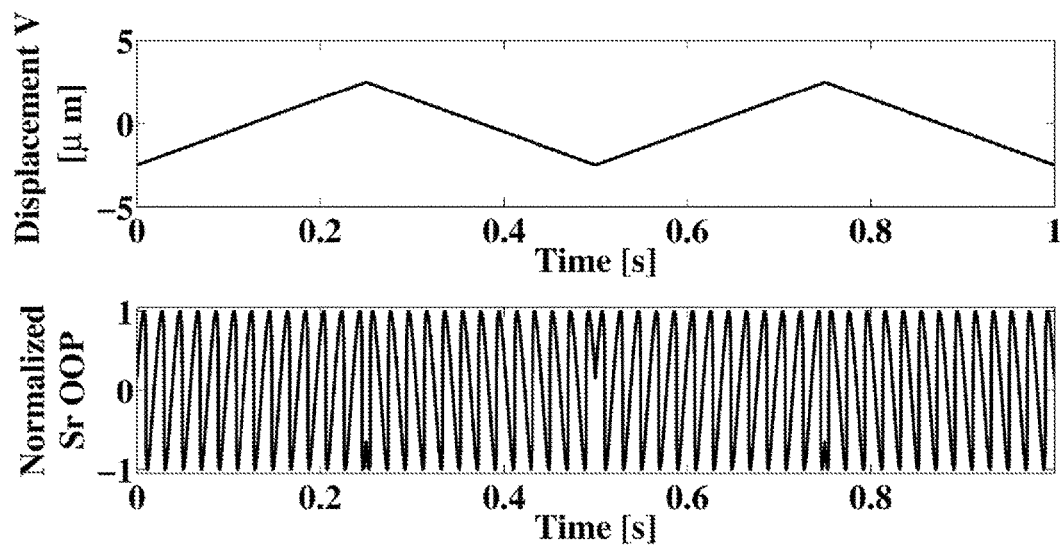
FIG. 4 show some signals associated to the embodiment of FIG. 3. The lower view presents the typical Sr OOP obtained for a displacement given by a triangular path motion V in the amplitude modulation DSMI configuration. The appearance of transitions is constant, thus producing a stable sampling frequency for the method. The upper view presents the displacement produced by the mechanical means S due to an electrical signal V, producing the OOP signal presented in the lower view.

For the embodiment of FIG. 3, the displacement means comprise a moveable support S onto which the single laser LD is mounted, and a driving mechanism (not shown) including at least one electrically excited vibrating element fixed or at least in contact with said support S, and electronic means (not shown) supplying said vibrating element with electrical signals predetermined for making it vibrate according to a physical displacement V performed along a time extent following a triangular path, as shown in the upper view of FIG. 4, whose lower view shows the reference SMI signal Sr obtained on a stationary target.

Figure 11:
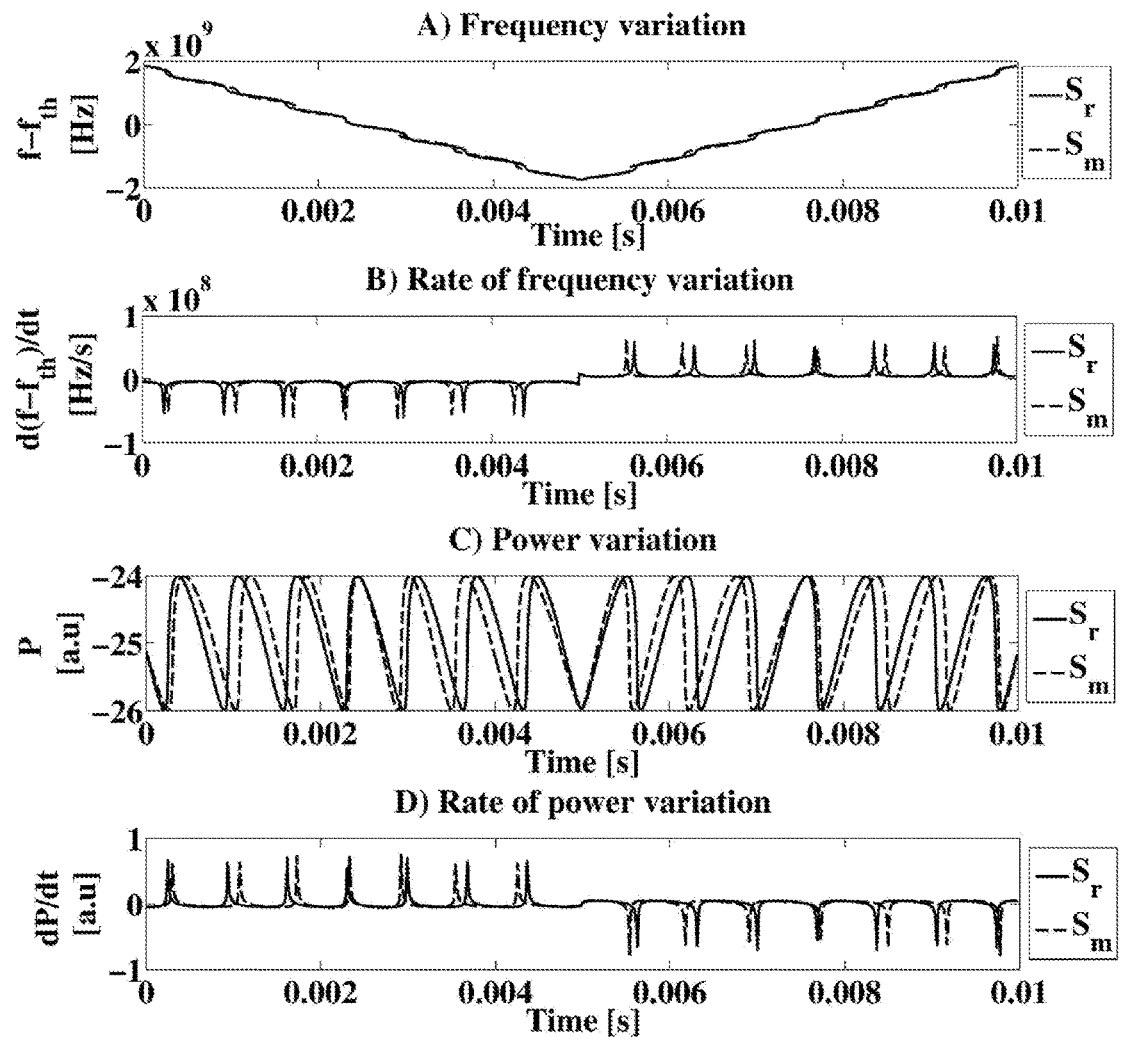
FIG. 11: Simulation results for proof of concept of the current modulation embodiment of the method of the first aspect of the invention. (a) Frequency variations produced by the reference current modulation Sr (solid line) and the reference current modulation plus the target modulation Sm (dashed line). As observed the fringe position has changed between both signals while keeping the same form and number on fringes. (b) Derivative of the phase variations. (c) Power variations in Sr and Sm. (d) Derivative of the power variations in Sr and Sm.

For the embodiment of FIG. 10, the system comprises driving current modulation means Em for providing to the single laser LD a driving current signal which is modulated in time in order to obtain both a reference and a main measurement signals (see FIG. 11a), said driving current signal being provided for the emission of a reference and a main measurement laser light beams onto the target T, in order to be reflected thereon and generate backscattered laser light which re-enters the laser cavity of the laser LD generating, respectively, the reference self-mixing interferometric signal Sr and the main measurement self-mixing interferometric signal Sm (see FIG. 11a).

In the following, the theoretical description of the differential self-mixing interferometry, of the mechanical modulation embodiment including the amplitude resolution calculation of the two DSMI cases for the proposed configurations (i.e. for the configurations shown in FIGS. 3 and 10) and also of the current modulation embodiment are presented in detail.

Differential Self-Mixing Interferometry:

Differential self-mixing interferometry (DSMI) is a method proposed (only in reference [6] and in the present invention) for the measurement of changes in the optical path length ($\Delta L$) in a range between 0 and half wavelength ($\lambda/2$), with a resolution in the order of a few nanometers. The optical path length (OPL) is defined as the product of the total distance (L) travelled by a beam with the refractive index (n) of the media. Mathematically, the OPL is expressed as:

$$OPL = \sum_{i=1}^{k} L_i n_i, \quad (4)$$

where k is the number of media with different refractive indices $n_i$ and with a length measured in void of $L_i$.

For the proposed case, it is considered that the OPL consists of a single medium (air with n~1). Therefore, it is possible to define a change of the optical path length as any change produced in the optical path caused by a target displacement ($\Delta L$), a change of refractive index ($\Delta n$), or a mixture of both effects, which can be expressed mathematically as:

$$\Delta(OPL) = n\Delta L + L\Delta n, \quad (5)$$

where L makes reference to the distance from laser to target and n the refractive index of the media in which the measurement is performed (typically air with n~1). Equation (5), can be reduced further if one considers that the refractive index changes are negligible compared to the displacement changes. Thus, it is possible to express:

$$\Delta(OPL) = n\Delta L, \quad (6)$$

Furthermore, OPL can be related to the laser phase, and, the optical phase difference (OPD) can be related to the phase difference as follows:

$$\phi = \frac{2\pi}{\lambda} OPL = \frac{2\pi}{\lambda} nL, \quad (7)$$

$$\Delta\phi = \frac{2\pi}{\lambda} OPD = \frac{2\pi}{\lambda} ndL. \quad (8)$$

A similar principle can be applied when the target is static and we are interested in measuring the small differences in refractive index ($\Delta n$).

Two main embodiments of the method of the first aspect of the present invention are proposed here for the use of DSMI. The first one, called in a previous section as "amplitude modulation embodiment" or "mechanical modulation embodiment", is based on the use of a mechanical stage to which a single laser LD is attached. By providing a mechanical modulation to the stage, a change on the optical path is produced causing fluctuations on the LD OOP and (if the amplitude is larger than $\lambda/2$) resulting in a well-known SMI signal in which the number of fringes is directly proportional to the amplitude of the displacement. The second embodiment, called in a previous section as "current modulation embodiment", uses a current source to control small variations of the laser wavelength to produce an also well-known SMI signal in which the number of fringes is directly proportional to the distance of the target. As it will be shown further on, both methods require the acquisition of a reference fringe pattern (reference) acquired for a "fixed" target which will be later compared with the fringe pattern/s (measurement signals) of a target suffering a random displacement. As it will be shown later, by comparing the fringe intervals between the reference and the measurement signals it is possible to recover the random displacement of the target.

As already clarified in a previous section, it is important to stress that according to the present invention the word "fixed" is used to describe a target placed in a defined position but which is not necessarily static. In fact, due to the proposed measurement scale (between 0 and $\lambda/2$) it is hard to find a target that behaves in a static manner. For the purpose of clarity, it is also important to say also that the term "static" is used only to refer a target that has a null amplitude displacement or a displacement that is below the resolution of the proposed method.

Next, the particularities for the amplitude/mechanical modulation embodiment (FIG. 3) and for the current modulation embodiment (FIG. 10) will be described separately.

Mechanical Modulation Embodiment:

As indicated above, two measurements obtained in different moments in time within the single laser LD in the setup are differentiated with the sub-index r for the reference signal Sr and m for the main measurement signal Sm.

In the mechanical modulation embodiment, a single laser diode LD is used to produce the Sm and Sr signals that will be used for the calculation of a target displacement. First, the laser diode LD is attached to a translation stage and it is aimed at a static target T. The recovered Sr signal is caused by a linear motion (constant speed) of the translation stage. Sr is finally stored in a memory device.

During the measurement, the laser LD is subdued to the same linear motion that produced Sr and is pointed to a target T suffering a random displacement of vibration within the range between 0 and $\lambda/2$ giving as a result the signal Sm. Since the target T is moving below the resolution of the classical SMI method, no apparent difference will appear between Sr and Sm which will have the same number of fringes in their respective OOPs. However, it is still possible to compare the changes between the fringe intervals happening in the Sr and Sm to estimate the difference of optical path change induced by the target displacement.

It is important to stress that all the comparisons are performed previous to any displacement reconstruction since the $\lambda/2$ resolution of the SMI method does not allow a comparison of the reconstructed waveforms with the resolution proposed by this method.

The mechanical modulation embodiment setup is shown in FIG. 3, which shows a mechanical target T at which a laser diode LD is aimed. After the laser beam be impacts the target T, part of the beam is back-reflected br to the LD cavity to produce the SMI phenomena. LD acts, thus, as a SMI sensor to obtain Sm and Sr, attached to a mechanical stage S which provides the triangular movement used as reference. The Sm and Sr signals are conditioned by an electronic card Dm (detection means) and finally digitized, stored and, once Sm and Sr are available processed by measuring means M. This type of configuration reduces some of the uncertainties introduced in the classic method due to the differences in the two LDs For further analysis, it will considered that the LD described is operating in the boundary between low and moderate feedback regimes, so C~1. It is desirable that the feedback factor remains within this level to keep a good SNR for the fringe detection algorithm and to avoid the fringe loss condition described in [7]. Temperature effects will be disregarded in this first analysis to get a better understanding of the measurement process and clearer equations.

Amplitude Resolution Theory:

As expressed by Eq. (2), the main effect of OFI is a phase change, i.e. SMI produces small fluctuations on the laser phase which can be related to a given displacement. Looking at the literature on displacement measurement we can see that the main relationship between phase and displacement is given by:

$$|\Delta\phi\tau| = \frac{2\Delta L}{\lambda} \leftrightarrow \frac{c}{2v_0} = \frac{\lambda}{2} = \phi_{F_{max}}, \quad (9)$$

where $\Delta L$ is the target displacement and $\lambda$ the LD wavelength. Thus, in principle any change of phase can be directly related into displacement and vice versa.

Figure 1:
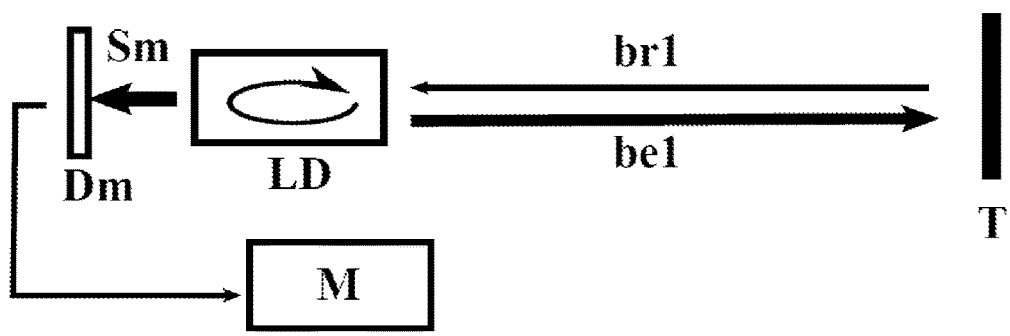
FIG. 1 shows a basic diagram of a laser under SMI: Part of the emitted laser beam be1 is back-reflected at the target and beam br1 re-enters the laser cavity of the laser diode LD, where it mixes with the standing wave producing a modulation of the OOP. The modulation is then captured by an internal monitor PD giving rise to a self-mixing signal Sm, captured by detection means Dm which enable the measurement to be processed using measurement methods M.
Figure 2:
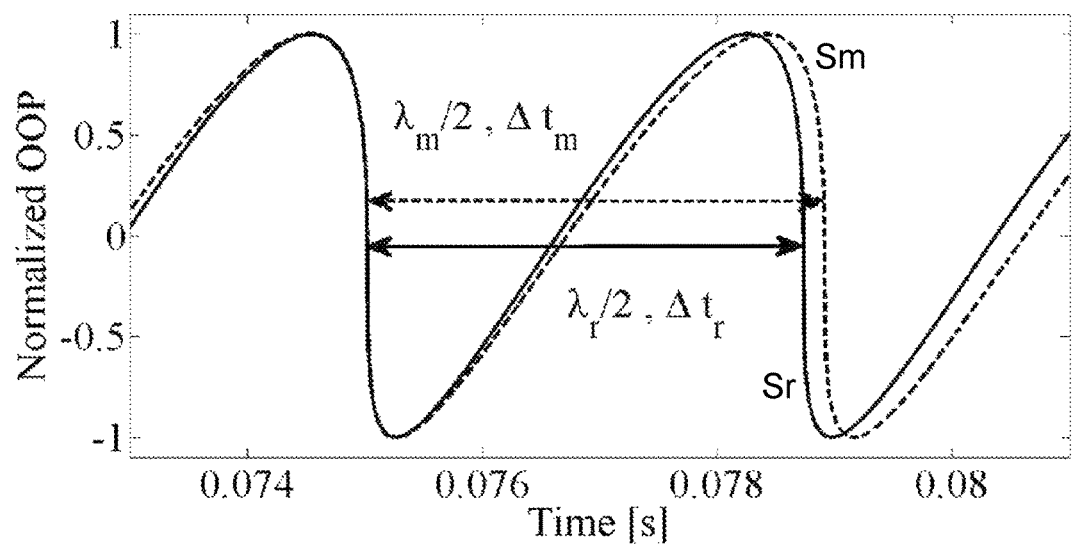
FIG. 2 graphically shows two typical OOP signals obtained directly for the amplitude modulated DSMI method proposed by the present invention. The current modulated case delivers equivalent fringes once the carrier modulation with time is removed.

Similarly, current can also be used as a mean of detecting phase change (i.e., the current modulation embodiment in the configuration of FIG. 10 may be used), as described in [8], for the purpose of absolute distance measurement. Hence, a typical pair of OOP signals used for amplitude modulated DSMI and current modulated DSMI after removing the carrier wave look as shown in FIG. 2 (Sm in dotted line and Sr in solid line), where it is clearly seen that while the time between transitions may be variable, the displacement is kept constant. Due to the complete equivalence of both approaches, a whole description of the analysis in terms of the amplitude modulation embodiment will be done next, and some particular considerations of each case will be described at the end of this Section.

It must be pointed out that, although in FIG. 3 both signals Sm and Sr have been depicted as sharing the same time line, i.e. as if they had been acquired simultaneously, as it has been described extensively above Sm and Sr are acquired at different moments, i.e. within different time windows, said time windows having been superimposed in FIG. 3 for illustrating purposes to allow clearly see the relative shifts between their respective fringes. In the same sense, the time line indicated in FIG. 3 (from 0.073 to 0.081 s) has only illustrating purposes, not corresponding necessarily to any of the real time lines at which Sm and Sr signals have been acquired, or only to one of said time lines. The present clarification is also applied to all of the appended figures which show both of the signals Sm and Sr sharing the same time line.

To begin the amplitude analysis, a ramp-like displacement of the LD, in the amplitude modulation embodiment, to generate a constant time difference between the two consecutive transitions of the reference SMI is considered. The ramp is preferred to other types of displacements since it will produce constant intervals between two consecutive SMI fringes which, as mentioned previously, appear whenever a displacement of $\lambda/2$ is produced. Thus, the time difference between consecutive fringes should be constant and can be estimated as:

$$\Delta t_r = t_{r_z} - t_{r_{z-1}}, \quad (10)$$

where $t_{r_z}$ is used to describe the sequential instant z at which a transition of the reference signal happens. The same equation applies for the measuring signal. In the case of having two lasers with the same wavelength, the comparison results in a null vector containing all the time intervals differences $\Delta t = t_m - t_r = 0$.

In the case of a difference of wavelength, which might be introduced by a drastic change on the measuring conditions (large increase of $CO_2$, differences of air humidity, etc.), a time difference is introduced making impossible the direct comparison of the relative position. Nevertheless, it is still possible to perform a comparison of the relative speeds since in both cases for the static target the difference of velocity should be null. Thus, for each measurement the velocity can be estimated as follows:

$$v = \frac{\lambda_x}{2\Delta t_x}, \quad (11)$$

where $\lambda_x$ is the wavelength of the laser and $\Delta t_x$ is the time difference defined in Eq. (10).

Redefining Eq. (11) and taking into account the numerical quantization introduced by the sampling analogue to digital converter (ADC), we can express the differences in the time reference related to the reference speed as:

$$\Delta t_r = floor_{\Delta t}\left(\frac{\lambda_r}{2v}\right), \quad (12)$$

where $floor_{\Delta t}$ limits the calculus resolution to the ADC sampling rate.

If the velocity difference for each time interval $\Delta t_r$ is calculated, one arrives to the expression:

$$\Delta v = \frac{\lambda_m}{2\Delta t_m} - \frac{\lambda_r}{2\Delta t_r}, \quad (13)$$

$$= \frac{\lambda_m \Delta t_r - \lambda_r \Delta t_m}{2\Delta t_m \Delta t_r}, \quad (14)$$

where the sub-indices r and m represent values corresponding to the reference Sr and the measurement Sm signals respectively. Taking into account that for a constant speed $\Delta t_m = \Delta t_r (1+\Delta\lambda/\lambda_r)$, $\lambda_m = \lambda_r \pm \Delta\lambda$ and considering a target displacement defined that introduces a small time difference $\Delta t_d$ in the measurement SMI, Eq. (14) can be written in the form:

$$\Delta v = \frac{(\lambda_r \pm \Delta\lambda)\Delta t_r - \lambda_r \Delta t_r\left(1 + \frac{\Delta\lambda}{\lambda_r}\right) + \lambda_r \Delta t_d}{2\Delta t_r^2\left(1 + \frac{\Delta\lambda}{\lambda_r}\right) - \Delta t_r \Delta t_d}, \quad (15)$$

$$= \frac{\lambda_r}{2} \frac{\Delta t_d}{\Delta t_r^2\left(1 + \frac{\Delta\lambda}{\lambda_r}\right) - \Delta t_r \Delta t_d}, \quad (16)$$

Finally, by applying numerical integration over the interval $\Delta t_r$ one can arrive to the displacement equation given by:

$$\Delta d = \Delta v \Delta t_r = \frac{\lambda_r}{2} \frac{\Delta t_d}{\Delta t_r\left(1 + \frac{\Delta\lambda}{\lambda_r}\right) - \Delta t_d}, \quad (17)$$

which for small displacements and typical LD conditions can be approximated to:

$$\Delta d \approx \frac{\lambda_r}{2} \frac{\Delta t_d}{\Delta t_r}, \quad (18)$$

thus making achievable, in theory, values of λ/1000 for common ADC sampling rates (in the order of 125 kS/s) and displacements with speeds of 38 μm/s. As it will be shown below, uncertainty because of numerical uncertainties, electronic filtering, temperature and acquisition limitations, has resulted in experimental resolutions of λ/100.

Considering that the calibration is performed in the same conditions of the measurement (which should be the most typical case), it is possible to reduce the formulations presented earlier into:

$$\Delta v = \frac{\lambda_r}{2} \frac{\Delta t_d}{\Delta t_r^2 - \Delta t_r \Delta t_d}, \quad (19)$$

$$\Delta d = \frac{\lambda_r}{2} \frac{\Delta t_d}{\Delta t_r - \Delta t_d}, \quad (20)$$

where the wavelength is equal for both signals.

It is also important to notice that it is possible to use an approximate value of the reference speed (which can be estimated from the specifications of the displacement stage, or by using the current to wavelength coefficient of the laser) for the calculations, instead of a pre-calibrated value. The use of this estimation, however, may induce some additional differences with the actual displacement because of the uncertainty of the reference value.

The amplitude modulation DSMI embodiment, shown in FIG. 3 and described above, reduces some of the uncertainties introduced in the DSMI configuration of [6], due to the differences in the two LDs and corresponding feeding and analysis system included in the latter. This type of measurement relies on the displacement stability of the reference stage, which can present different levels of mechanical coupling.

Sampling Frequency:

To understand the effective sampling rate in this case, the OOP waveform produced by a half period (T/2) triangular displacement of micrometric peak to peak amplitude A with starting displacement in the forward direction (which corresponds to the direction of the reference displacement approaching the target) has to be considered. In such case, it can be expected that the transitions of the OOP (i.e. of Sr, as shown in the lower view of FIG. 4) happen at a constant rate that depends on the constant velocity v developed over the ramp motion of the triangular reference displacement (upper view of FIG. 4) as shown on the ramp section of FIG. 4. Thus, it is possible to write the sampling frequency $f_s$ as:

$$f_s = \frac{2v}{\lambda_r} \approx \frac{2A}{\lambda_r \frac{T}{2}} = \frac{4A f_r}{\lambda_r} \quad (21)$$

where $f_r$ is the frequency of the reference triangular displacement and $\lambda_r$ the wavelength of the laser used as reference. The preceding equation holds-on for any ramp-like displacement with amplitude larger than λ. In the case of typical DSMI measurements, a triangular motion is used because of the finite travel length of the piezoelectric actuator used as reference. Longer displacements are preferred in order to minimize possible sampling errors introduced by the discontinuities generated during the change of direction in the reference displacement.

Other types of reference displacement can be used (sinusoidal, for instance), although in such cases the sampling is not uniform, making it impossible to quantify the sampling frequency. In the particular case of a sinusoidal reference displacement, it is still possible to get an idea of the sampling frequency, which is only miss-evaluated in the regions near the maxima and minima of the reference displacement.

Figure 5:
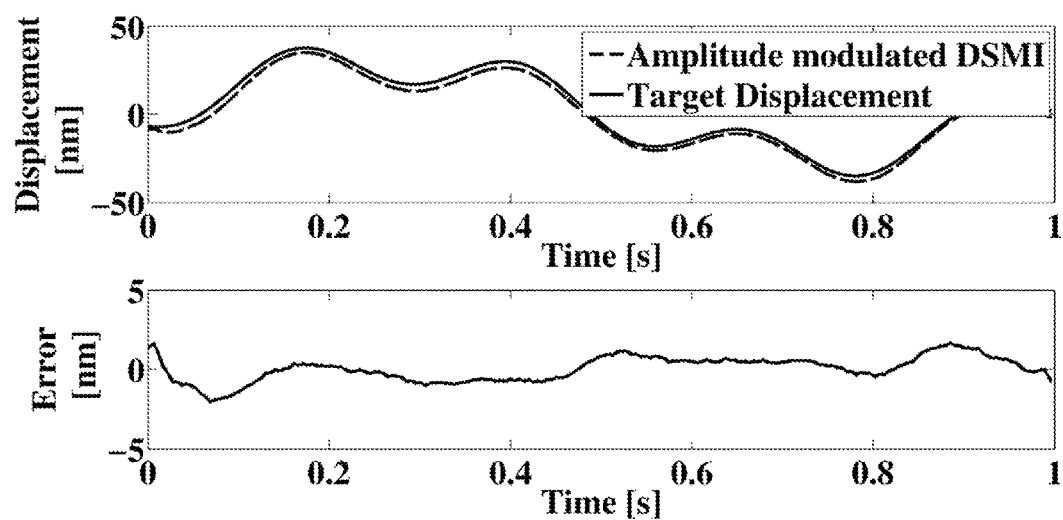
FIG. 5 shows results simulated with the configuration of FIG. 3 (amplitude modulation). In the upper view, the displacement implemented on the simulated target (solid line), and the corresponding simulated measurement by amplitude-modulated DSMI case (dashed line) are presented. In the lower view, the error between the reconstructed amplitude modulated DSMI measurement and the expected target displacement is shown.

Simulation Results:

The method of the invention, for this amplitude modulation embodiment, was tested by simulation calibrating the measurement with C~1. Once the reference displacement is acquired, only the time differences are acquired and saved for the measurement signal processing. An example of the reconstruction obtained by this method is shown in FIG. 5.

Tests of the performance of the method were also tested for the cases of a change of C value and the effects of noise over the recovered SMI signal. Results are shown on Table 1, in the form of average mean error and standard deviation values of interpolated amplitude modulation DSMI for the simulated random motion shown in FIG. 5.

TABLE 1

| Test | Avg. Error [nm] | Std. Dev. [nm] |
|---|---|---|
| C~1.0 | 0.3745 | 0.4493 |
| C~0.5 | 0.38158 | 0.4336 |
| C~0.1 | 0.5111 | 0.6548 |
| SNR~0 | 0.5425 | 0.6788 |

Linearity errors may also arise if the velocity of the reference is not computed with accuracy enough. In the example it is shown that an error of 2 μs in the time differential induces errors up to 2 nm instead of the expected 0.4 nm. Higher errors induce larger linearity errors. Some of these errors can be reduced by using a polynomial fitting when it is observed that the displacement goes beyond a λ/2 threshold.

Figure 6:
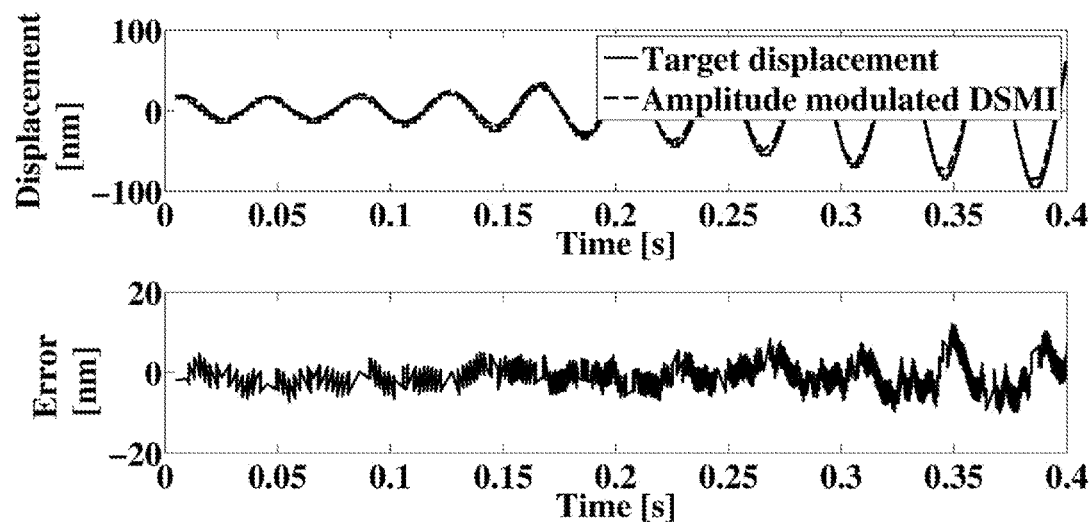
FIG. 6 shows real experimental results obtained from a series of measurements performed using amplitude-modulated DSMI using the configuration of FIG. 3. A reference displacement using the internal capacitive sensor of the piezoelectric stage used as target is presented. The target is driven by an amplitude modulated sinusoidal signal with a maximum amplitude of 200 nm. Upper view: comparative of the target displacement from the capacitive sensor (solid line) and the amplitude modulated DSMI measurement (dashed line). Lower view: experimental error between the amplitude modulated DSMI measured displacement and the capacitive sensor measured displacement.

Experimental Results:

A series of measurements were performed using amplitude modulation DSMI (i.e. with the configuration of FIG. 3), and the obtained signal was subjected to a pre-processing and a post-processing. Results are summarized on Table 2, which shows the error average obtained after several tests on four different signals. An example of the experimental reconstruction obtained using DSMI compared to that of the capacitive sensor tracking the displacement of the target can be found on FIG. 6. Table 2 shows the mean error and the standard deviations in comparable measurements. It is important to remark that measurements S3 and S4 were performed without a real reference measurement, but using only direct estimation of the speed taking into account the source used as feed for the reference piezoelectric. Thus, if there is a previous knowledge of the displacement, and no reference signal is available, it is still possible to have errors in the order of 10 to 14 nm by estimating the reference displacement.

TABLE 2

| Test | Mean Err. [nm] Self-Referenced | Std. Dev. [nm] |
|---|---|---|
| S1 | 4.0932 | 5.2457 |
| S2 | 9.6961 | 12.3421 |
| S3 | 11.6481 | 14.0326 |
| S4 | 9.4554 | 12.1795 |

In a test performed over a low reflective target, the amount of noise for the capacitive sensor was shown to be is similar to the one obtained by the amplitude modulated system (FIG. 7), in special if the edge effects on the DSMI measurements are disregarded. The noise in the measurements is due partly to the mechanical coupling of the system with the lab environment, to changes in air pressure, to electrical noise and numerical limitations.

Figure 7:
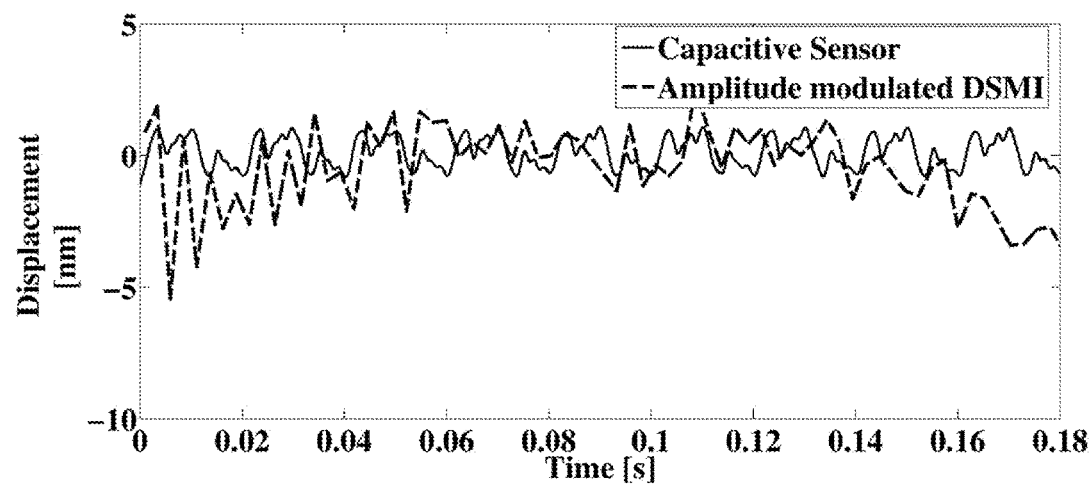
FIG. 7 shows a comparison of the noise values between the measurements of the capacitive sensor referenced on FIG. 6 and the amplitude modulated DSMI when the translation stage is static and subject only to gravitational forces. The internal compensation loop of the piezoelectric stage produces random displacements in the order of a few nm which are acquired by both sensors. The amplitude modulation DSMI shows average errors in the order of 1.5 nm relative to the capacitive sensor, and even smaller when edge effects are disregarded.
Figure 8:
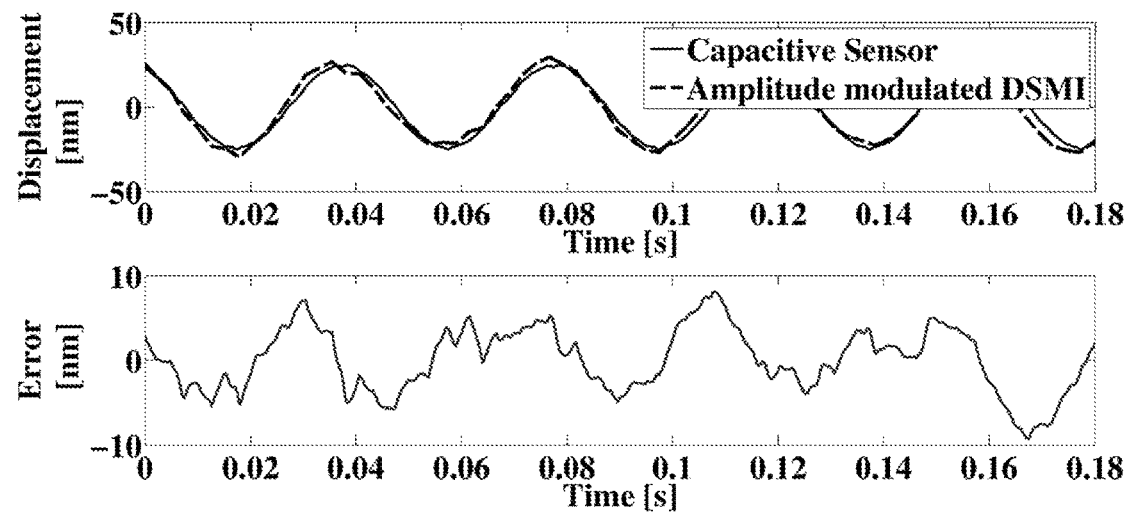
FIG. 8 shows an amplitude modulated DSMI measurement, obtained with the embodiment of FIG. 3, for a sinusoidal target motion with a constant frequency of 25 Hz and 50 nm of amplitude. A 152 µm/s reference speed is used for the motion of the physical displacement. The upper view shows the reconstructed amplitude-modulated DSMI displacement signal (dashed line) and the target displacement measured by the capacitive sensor (solid line). The lower view shows the error between the two measurements.
Figure 9:
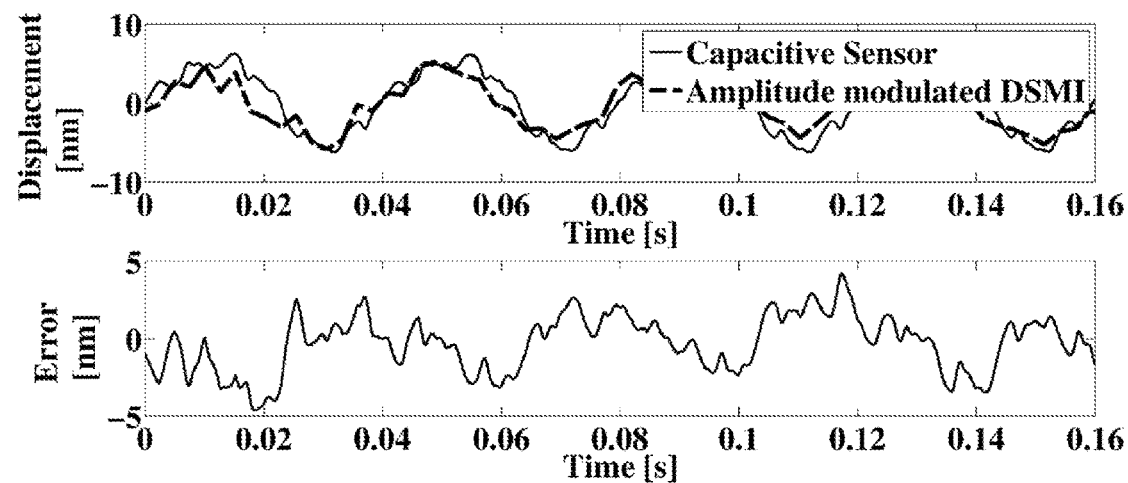
FIG. 9 is analogous to FIG. 8 but for a 12 nm displacement.

In a measurement performed for a 25 Hz and 50 nm amplitude sinusoidal motion and a reference speed of 152 μm/s (FIG. 8), the value of noise after the reconstruction shows similar figures to the ones presented in FIG. 7. Thus, the method shows its performance even in estimated reference conditions. Similar values are also found for a target displacement of just 12 nm at a similar frequency, as shown in FIG. 9.

Current Modulation Embodiment:

Laser chirp (frequency/phase modulation) induced by direct modulation of a laser using electrical means or any external modulation device such as an electro optical modulator, has been previously used to measure the absolute distance between laser and target [8, 10, 11, 12]. The modulation by current is used for distance estimation in the general SMI approach. The measurement scheme used for distance measurement is different from the displacement measurement method proposed by the present invention according to the present current modulation embodiment. The technique differs in practical terms from the typical SMI since the modulation of the OOP is produced by changes over the laser driving current instead of the displacement of the target T. The current is typically modulated (in both approaches: range finding (i.e., conventional current modulation SMI), and DSMI), in a triangular fashion and the SMI fringes can be obtained using a differentiation algorithm. This type of modulation takes advantage of the emission changes produced by the change of current. For a static target the resolution is given as:

$$L = N \frac{\lambda^2}{2\Delta\lambda}, \tag{22}$$

where L is the absolute distance to the target, Δλ the maximum change of wavelength due to current change, and N the number of fringes produced in half period of the triangular wave. Typical resolutions in displacement reconstruction with NIR LDs lie around 4 mm.

While, in principle, it is possible to measure displacements using this method by making a direct difference of two measured target distances at different times as described in [10] or [8], the obtained resolution is limited to 0.5 mm. It is also important to say that the measurements performed on [10] and [8] require that the target is static in a position while the measurement is acquired. Thus, in that type of measurement the main concern is the detection of distance while the proposed method deals with the measurement of displacement (change of optical path) from the comparison of the fringe signals Sr and Sm taken on a fixed target that in a first moment is static for the acquisition of Sr (or undergoing a known vibration) and during the measurement is not static for the acquisition of Sm but suffering a random displacement.

The current modulation embodiment is composed, as shown in FIG. 10 and described above, by a single laser diode LD that is current modulated by the source Em. When the emitted beam be impacts a fixed target T part of the light is back reflected br producing the SMI phenomena. Then the signals, Sr when the acquisition is done for the static (or undergoing a known vibration) target T and Sm when the acquisition is done for a non-static target T undergoing a random displacement wanted to be measured, are preconditioned using an electronic card Dm (detection means) and finally the information is stored and processed by measuring means M.

To understand the proposed method for the here described current modulation embodiment, first, consider only a current modulation that is applied to a laser. When the laser is directly modulated, this process not only changes the intensity of its signal but also its emission wavelength which is inversely related with the laser frequency by) $\lambda=c/f_{th}$ where c is the speed of light in air and $f_{th}$ the free running laser frequency. Under this condition, the laser can be thought as multi-wavelength source whose wavelength changes with time. When the light emitted by the LD strikes the stationary target, some part of it will be reflected back to the laser cavity where it will interfere with the light inside of the LD cavity (whose wavelength is changing continuously) causing a fringe pattern also known as interferogram. The phase difference between two consecutive fringes has, by definition, a value of $2\pi$. It has been shown by different authors [12, 10] that the number of fringes produced depends upon the round trip time delay (separation of laser and target), and peak to peak wavelength change due to modulation current. Therefore, it is possible to select a triangular current modulation such that the fringes of the reference are equidistant in time. In the case where the target, after being fixed at some distance, is stationary and the laser is current modulated as discussed earlier, it is possible to retrieve a reference signal denoted Sr which will be used as reference for the method. Once Sr is acquired, the time of occurrence of each fringe is obtained, as well as the intervals between two consecutive fringes of Sr. All the parameters related to Sr which will be further on denoted with a sub-index r.

Now, consider that the fixed target is no longer static (or no longer undergoing only a known vibration but also undergoing a random displacement wanted to be measured). From classical interferometry theory we know that, the displacement of $\lambda/2$ produces a fringe. So, if the amplitude of the target displacement is smaller than $\lambda/2$, there will be no additional fringes produced by the target motion. Thus, the number of fringes remains constant while the target displacement changes the wavelength as seen by the laser because of variations of the OPL. This results in a new set of shifted fringes as compared to former (when only current modulation was applied). All the parameters related to Sm, which further on is referred as vibration case, will be further on denoted with a sub-index m.

Since the fringe shift is caused by the target displacement, it must contain information about it. The target frequency and amplitude can be retrieved by further signal processing which consists in comparing the fringe intervals between Sr and Sm.

Amplitude Resolution:

The set of equations that govern the current modulation embodiment are given below, where the frequency of SMI signal, phase and its power are noted by f, $\phi(t)$ and $P(t)$ respectively [11, 12].

$$\Delta\phi_r = 2\pi\tau_{ext}[f_{cr} - (f_{th} + i_r(t)\Omega_f)] + C\sin(2\pi f_{cr}\tau_{ext} + \arctan\alpha) = 0, \quad (23)$$

$$P_r(t) = \cos(2\pi f_{cr}\tau_{ext}), \quad (24)$$

$$\Delta\phi_m = 2\pi\tau_{ext}[f_{cm} - (f_{th} + i_r(t)\Omega_f)] + C\sin(2\pi f_{cm}\tau_{ext} + \arctan\alpha) = 0, \quad (25)$$

$$P_m(t) = \cos(2\pi f_{cm}\tau_{ext}), \quad (26)$$

where $\Delta\phi(t)$ is the excess phase, $\tau_{ext}=2L_{ext}/c$ is the external round trip time for the reference case, $\tau_{ext}(t)=2L_{ext}(t)/c$ round trip time for vibration case, $f_{cr}$, $f_{cm}$ are the emission frequencies of the laser after feedback for the reference case and the vibration case respectively, $f_{th}$ is the free running frequency of laser at its operating point, $i_r(t)$ is the triangular AC modulation current, $\Omega_f$ is the frequency coefficient of the laser, C is feedback strength, $\alpha$ is the linewidth enhancement factor, P is the normalized contribution of feedback to the emission power of the laser, $L_{ext}$ is the stationary distance from the target to the laser, $L_{ext}(t)=L_{ext}+a(t)$, $a(t)=At+\sin(2\pi f_t t)$ is a target motion with peak amplitude and frequency $A_t$ and $f_t$ respectively.

Under the assumed conditions where the emitted laser beam covers twice the physical path between LD and T, it is possible to relate the phase difference ($\Delta\phi$) and the target motion (dL) as:

$$\Delta\phi = \frac{4\pi}{\lambda}dL = \frac{4\pi}{\lambda}a(t), \quad (27)$$

where the target motion $a(t)$ and the phase difference $\Delta\phi$ of the reference signal Sr and the measurement signal Sm are related. Using Eq. (23) and Eq. (25) it is possible to obtain the phase of the SMI signals for the reference (Sr) and of the measurement (Sm), and which we will denote $\phi_{ref}$ and $\phi_{mn}$ respectively, which we can write as:

$$\phi_{mn}=2\pi f_{cm}(t)\tau_{ext} \quad (28)$$

where $f_{cm}(t)$ is found solving Eq. (26) and $f_{th}/f_{cm}\approx 1$, thus:

$$\phi_{mn} = 2\pi f_{th}(t)\tau_{ext} = 2\pi f_{th}\frac{2[L+a(t)]}{c} = \frac{4\pi}{\lambda}(L+a(t)) \quad (29)$$

Similarly, for Sr it is possible to obtain $$_{ref} = \frac{4\pi}{\lambda}L.$$

If we compare both phases we end up with $$_{mr} = \frac{4\pi}{\lambda}a(t)$$

which contains the information of the displacement.

Therefore, as in the mechanical modulation embodiment, the displacement amplitude can be inferred from the time differences between two consecutive fringes. Another way to express this mathematically is:

Let $t_r$, $t_m$, $t_{rr}$, $t_{mr}$ be vectors containing time of occurrence of fringes in Sr, Sm, the time difference between fringes in Sm and the time difference between the intervals in Sm and Sr. Mathematically:

$$t_r=[t_{r1},t_{r2},\ldots,t_{rn}], \quad (30)$$

$$t_m=[t_{m1},t_{m2},\ldots,t_{mn}], \quad (31)$$

$$t_{rr}=[t_{r2}-t_{r1},t_{r3}-t_{r2},\ldots,t_{rn}-t_{rn-1}], \quad (32)$$

$$t_{mr}=[t_{m1}-t_{r1},t_{m2}-t_{r2},\ldots,t_{mn}-t_{rn}], \quad (33)$$

where the vector element $t_{xk}$ represents the time of occurrence of the $k^{th}$ fringe and $x=[r,m]$ corresponds to the reference signal and the vibration fringes respectively.

In each interval a phase change of $2\pi$ is produced leading to an equivalent displacement of $\lambda/2$. Thus, in a time $t_{mr}^n$, where n represents the nth element of the corresponding vector, a phase change of $$2\pi \frac{t_{mr}^n}{t_{rr}^{n-1}}$$

and a displacement of $$\frac{\lambda}{2} \frac{t_{mr}^n}{t_{rr}^{n-1}}.$$

Thus, the target displacement can be computed as:

$$A_{t,rec} = \frac{\lambda}{2} \frac{t_{mr}^{n-1}}{t_{rr}^{n-1}}, \tag{34}$$

Sampling Frequency:
Let $$f_r = \frac{1}{T_r}$$

be the modulation frequency of the current to the laser. In the time $T_r=2 \to N$ fringes $\to N-1$ sample points. In time $$1 \to \frac{1}{T_r - 2}$$

fringes$\to$(2N$f_r$-1) sample points. Thus the sampling rate for target reconstruction is given by:

$$f_{s,rec} = (2Nf_r - 1), \tag{35}$$

From Nyquist theorem, the maximum frequency that can be reconstructed is half the sampling rate and given by:

$$f_{t,rec} = \frac{2Nf_r - 1}{2}, \tag{36}$$

since $2Nf_r \gg 1$, the above equation can be approximated as $$f_{t,rec} = Nf_r, \tag{37}$$

For example we consider a case with following experimental data $f_m=100$ Hz (1 MHz) and N=9. Under these details we have 9 fringes according to Eq. (37), the maximum frequency of target vibration (bandwidth) will be 900 Hz (9 MHz). In should be noted that, in practice the LD can be modulated to GHz range, so it is possible to detect target vibration up to GHz range. To our knowledge, this is the first time that vibrometry of this frequency bandwidth has been presented using SMI.

From Eq. (37), we see that the bandwidth of target frequency is directly dependent upon the number of fringes and the modulation frequency of the current. Hence, greater the number of fringe, the better is the target vibration frequency bandwidth, or, increasing the modulation frequency also enhances target vibration frequency bandwidth.

From Eq. (22), the number of fringes (N) can be computed as $$N = \frac{2\Delta \lambda L}{\lambda^2} = \frac{2(2A_r \Omega_f)L}{\lambda^2} = \frac{4A_r \Omega_f L}{\lambda^2}, \tag{38}$$

Then, N can be increased by increasing the amplitude of the current modulation ($A_r$). This parameter depends upon the laser characteristics as the current amplitude cannot be increased to an extent beyond the laser specifications. Also this range is determined by the linear region of current vs. wavelength curve of laser. Secondly the number of fringes can be increased by choosing the laser with high frequency coefficient ($\Omega_f$), but this also is determined by the laser manufacturer and is often in order of 0.005 nm/mA(3 GHz) at 10 GHz modulation frequency [11]. Thirdly, N can be increased by increasing the frequency of current modulation ($A_f$). Typically the laser can be modulated up to the GHz range using direct modulation and it is determined by the laser manufacturer. Fourthly, it can also be increased by choosing laser of lower emission wavelength ($\lambda$). Furthermore, the number of fringes can also be increased by increasing the distance between laser and external target (L). Thus we see that increasing the frequency bandwidth of proposed SMI-LV sensor is determined by the laser parameters peak amplitude of current modulation ($A_r$), frequency of current modulation ($A_f$), emission wavelength ($\lambda$) and frequency coefficient of the laser ($\Omega_f$). The degree of freedom to attain high N can be optimized by increasing the distance between target and laser (L), which we can work on.

Simulation Results:

For proof of concept, simulations for the current modulation embodiment using the parameters listed in Table 3 were carried to check if there were frequency, phase and power variations in both the cases. Two cases are studied (both referring to the current modulation embodiment or embodiment), in the first case (Case 1), the target is static during the acquisition of Sr and in the second case (Case 2), we consider that the target is already experiencing a small vibration which is previously known.

Case 1: Acquisition of Sr with an Static Target

In this case, we consider that the target is totally fixed (which means that it has 0 displacement relative to the DSMI sensor resolution) during the acquisition of the reference signal Sr.

Non-linear equations Eq. (23) and Eq. (25) are solved numerically to find laser emission frequency for both modulation and vibration cases e.g. $f_{cr}$ and $f_{cm}$ respectively and its corresponding phase are shown in FIG. 11a and its derivative in FIG. 11b. These values are found using the expressions:

$$\phi_r(t) = 2\pi f_{cr}(t)\tau_{ext}, \tag{39}$$

$$\phi_m(t) = 2\pi f_{cm}(t)\tau_{ext}, \tag{40}$$

Finally the SMI power signal is calculated using Eq. (24) and Eq. (26) as it is shown in FIG. 11(c) and its derivative in FIG. 11(d). Simulation results confirm that a shift in emission frequency, phase and power as seen from FIGS. 11a and c respectively and its derivative in FIGS. 11b and d respectively where the shift is clearly visible.

TABLE 1

Simulation parameters

| Parameters | Value |
| --- | --- |
| Distance to the target ($L_{ext}$) | 0.3 m |
| Peak to peak modulating current ($i_{rpp}$) | 1.5 mA |
| Modulation frequency (fr) | 100 Hz |
| Target vibration amplitude (peak) ($A_m$) | $\lambda$/10 nm |
| Target vibration frequency ($f_t$) | 200 Hz |
| Frequency modulation coefficient of laser ($\Omega_f$) [9] | −3 GHz/mA |
| Laser operating point ($l_{op}$) | 45 mA |
| Feedback strength (C) | 0.9 |
| Emission wavelength of laser ($\lambda_{th}$) | 692 nm |
| Linewidth enhancement factor ($\alpha$) | 3 |
| Speed of light in air (c) | $3 \times 10^8$ m/s |

Case 2: Acquisition of Sr with a Target Suffering a Known Motion

In this case, we consider that the target cannot be set totally static and therefore it is suffering a motion that was measured previously by some method. Let the initial frequency and amplitude of the target vibration be $f_{t,ini}$, and $a_{t,ini} = A_{t,ini} \sin(2\pi f_{t,ini} t)$ respectively. Provided that $A_{t,ini} < \lambda/2$, which is lower than the amount of displacement that will result in an extra fringe on Sr (which in concept is also extended to the mechanical modulation), it is possible to define $OPD_1 = a_{t,ini}(t)$.

In a second step, the target is subjected to a motion with frequency $f_t$ and amplitude $a_t(t) = A_t \sin(2\pi f_t t) + a_{t,ini}$, with the resulting $OPD_2 = a_{t,ini} + at$. Again the comparison of the phase difference between 1 and 2 result in the target displacement $OPD = OPD_2 - OPD_1 = a(t)$. Therefore the proposed method holds for a target already in motion.

Figure 12:
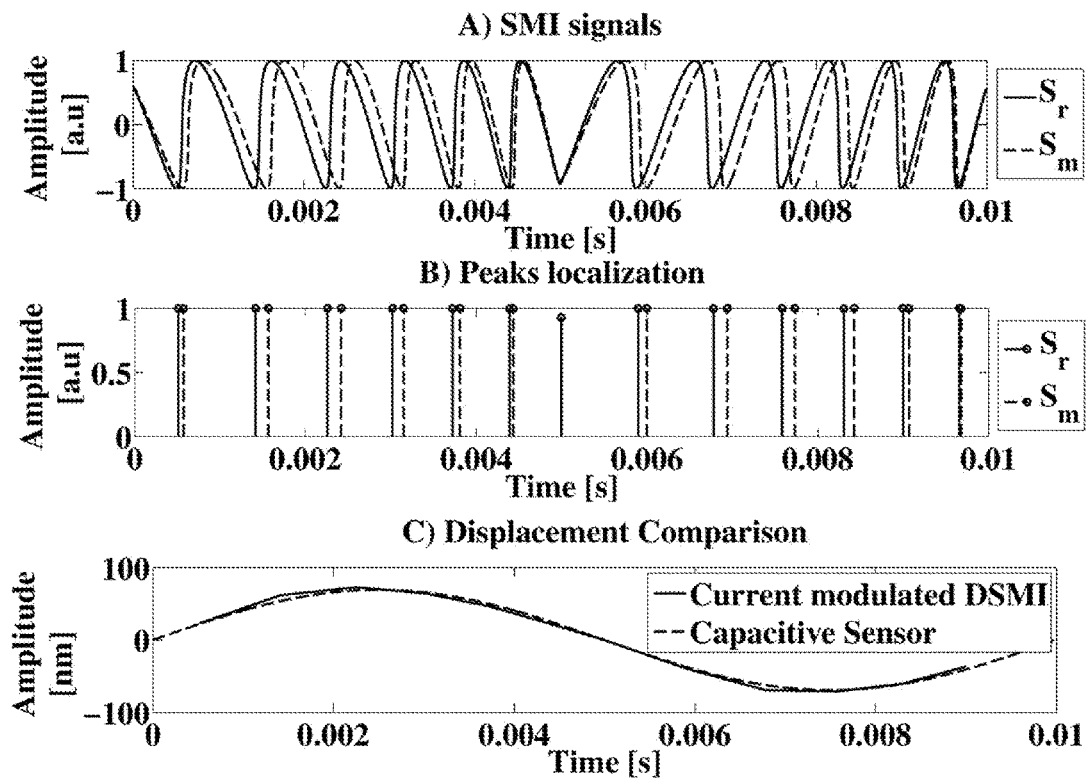
FIG. 12: Simulation results. (a) Power variation of SMI signals with time in current modulation case (Sr in solid line and Sm in dashed line). (b) Peak localization of the SMI signals. (c) Target displacement retrieved (solid line) against capacitive sensor reference (dashed line).

To further support these arguments a simulation was performed using Eq. (23) and Eq. (25) and the values described in Table 4. The results are plotted in FIG. 12.

TABLE 2

Simulation Parameters

| Parameters | Value |
| --- | --- |
| Distance to the target ($L_{ext}$) | 0.4 m |
| Peak to peak modulating current ($i_{rpp}$) | 1.0 mA |
| Current modulation frequency (fr) | 100 Hz |
| Initial target vibration amplitude ($A_{r,\,ini}$) | $\lambda$/20 nm |
| Initial target vibration frequency ($f_{t,\,ini}$) | 100 Hz |
| Final target vibration amplitude ($A_m$) | $\lambda$/10 nm |
| Final target vibration frequency ($f_t$) | 100 Hz |
| Frequency modulation coefficient of laser ($\Omega_f$) [9] | −3 GHz/mA |
| Laser operating point ($l_{op}$) | 45 mA |
| Feedback strength (C) | 0.9 |
| Emission wavelength of laser ($\lambda_{th}$) | 692 nm |
| Linewidth enhancement factor ($\alpha$) | 3 |
| Speed of light in air (c) | $3 \times 10^8$ m/s |

Experimental Results:

In the experiment, Hitachi HL6501 with 0.65 nm band AlGaAsP with a MQW structure laser diode (LD) was used. The emission wavelength as mentioned in specification sheet was 658 nm but the measured emission wavelength was 692 nm Instrument System's SPECTRO 320(D) R5. To obtain frequency chirp (wavelength sweeping), laser was directly modulated. Since, laser showed mode hopping, the spectral characteristics of the laser as a function of the injection current were studied to locate the optimal operating point of laser.

Figure 13:
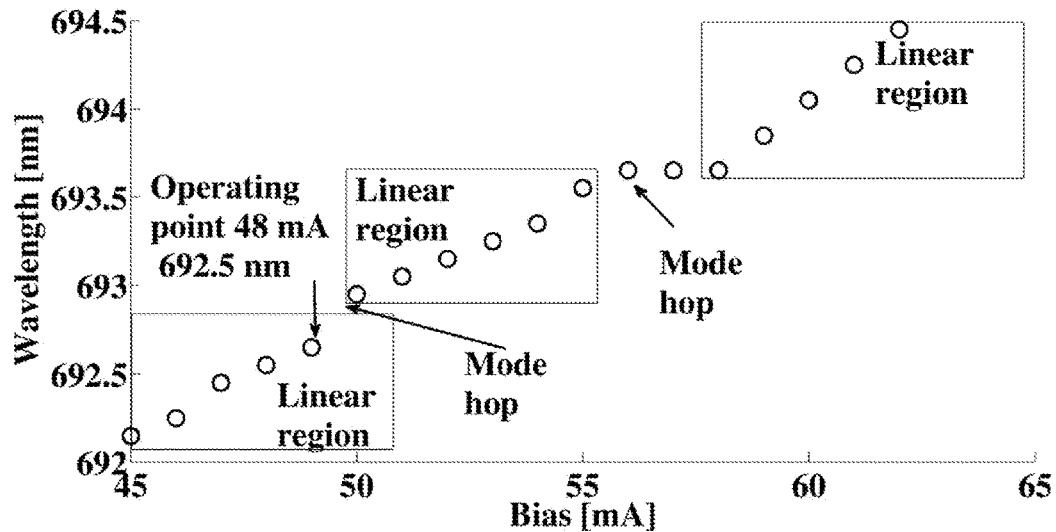
FIG. 13: Variation of emission wavelength with bias current for an experiment performed for an implementation of the current modulation embodiment of the method of the first aspect of the invention

For this purpose, the bias current was changed and the emission wavelength was measured with the help of a spectrometer. The variation of wavelength emission is shown in FIG. 13. The bias current was changed from 45 mA to 62 mA. The experimental results show that there are three linear regions that can be chosen as an operating point (from i=45→49, i=50→56 and i=59→62 mA) and that there are two regions with mode hopping (i=49→50 mA and i=56→59 mA respectively). For the experiment, the operating point of the laser was chosen to be $I_{th}$=48 mA and $\lambda_{th}$=692.5 nm.

In order to produce the continuous frequency chirp, the bias current at operating point ($I_{th}$) was modulated by a continuous triangular signal with peak to peak amplitude of 250 mV and frequency $f_r$=100 Hz. The chirped signal, as emitted by the LD, is focused by a focusing lens 352240 B with focal length and numerical aperture 8 mm and 0.5 respectively placed at distance of 3.5 mm from laser. A piezoelectric PI-LISA with a maximum travel range of 25 μm and silver surface is placed at a distance of 12 cm acting as a target. After choosing the optimal point for experiment, the target is kept stationary and the laser is modulated by the triangular signal with peak to peak amplitude 250 mV and frequency 100 Hz. Since the target is stationary, the reference signal Sr is obtained. The signal, as previously explained, contains a set of fringes with a phase between consecutive fringe equivalent to π. Again, the time occurrence of each fringe is saved for comparison with the fringe intervals of Sm. Next, under the same current modulation condition, the target is vibrated by applying AC sine signal to the piezoelectric from a signal generator (measurement signal Sm). Because of the target (PI LISA) motion, an OPD between laser and target changes resulting in a shift in the fringes when compared to the Sr case. The time of occurrence of the vibration fringes is also noted. The shift of the fringe time position is caused by the target motion and contains the signature of the target amplitude and frequency. As previously presented, the target displacement is calculated from these time of occurrence of reference and vibration fringes.

Figure 14:
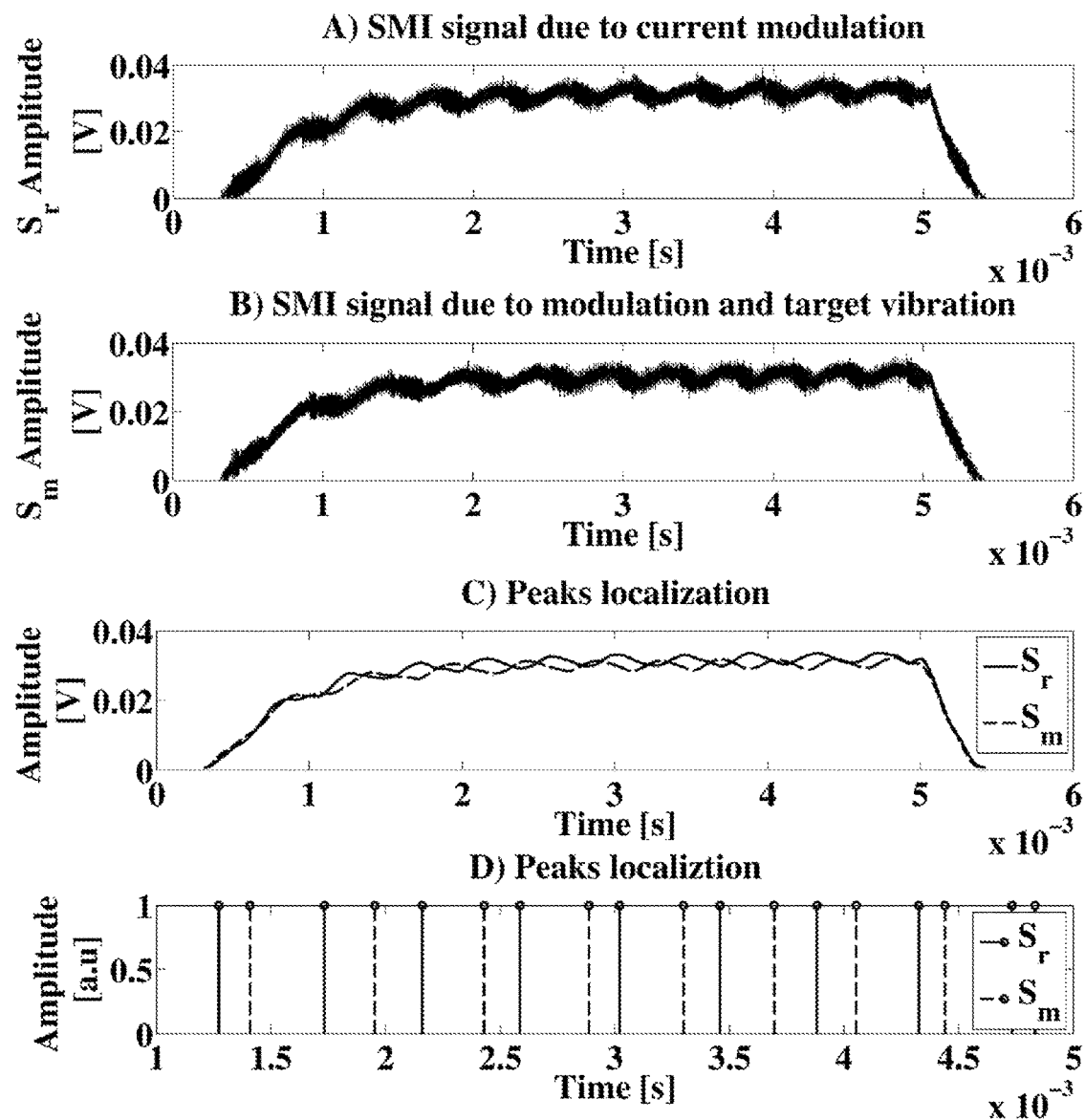
FIG. 14: Experimental results for the experiment performed for said implementation of the current modulation embodiment of the method of the first aspect of the invention. (a) SMI signal when current is modulated, i.e. Sr; (b) SMI signal when current modulation is accompanied by target vibration, i.e. Sm; (c) De-noised SMI signal obtained using wavelet transformation and time of occurrence of fringes for Sr (solid line) and Sm (in dashed line); (d) fringe position in Sr (solid line) and Sm (dashed line) reveals a shift that contain signature of target motion.

Finally FIG. 14*d* shows the experimental shift in fringes due only to current modulation (solid line) and when current modulation is accompanied by target vibration case (dashed line). Once the time of occurrence of the reference signal (solid line), i.e. Sr, and vibration case signal (dashed line), i.e. Sm, is computed, using Eq. (18), the target displacement is calculated.

Figure 15:
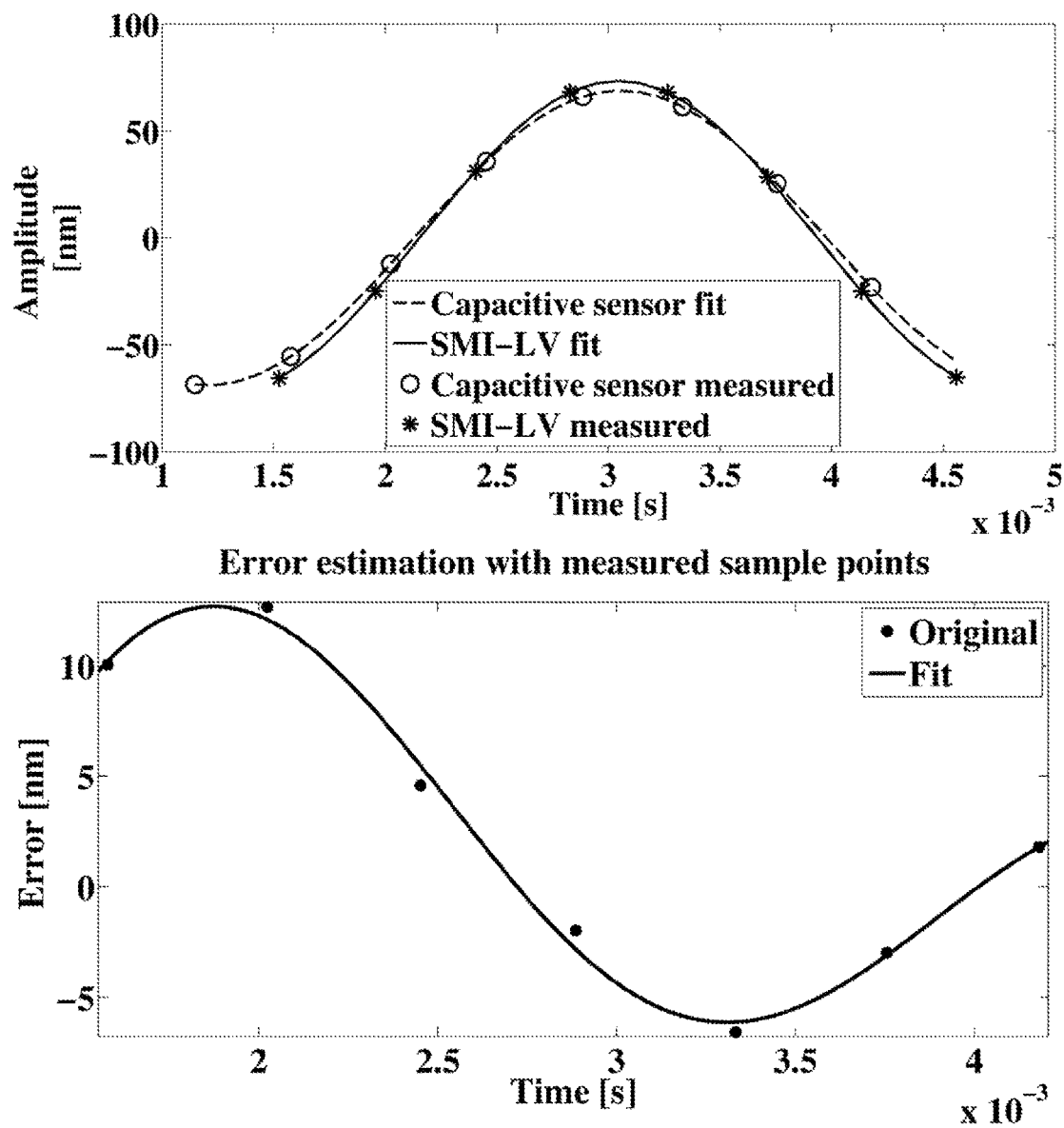
FIG. 15: Comparison of SMI-LV (where LV means "Laser diode voltage") against reference standard capacitive sensor with curve fitting, delay compensation and interpolation on top and absolute error of the reconstruction on bottom.

In order to make a precise comparison, the time delay between both the sensors is computed using curve fitting technique. Crude target displacement SMI-LV signal and the signal measured from capacitive reference sensor are fitted to a sin(bt+c) with fitting parameters a, b, c and the goodness of the fit listed in Table 5. Once the calculated delay of 0.38 ms. is added to the signal from SMI-LV, it is possible to obtain the waveform shown in FIG. 15 top which compares the current modulation method measurement with the capacitive sensor of the piezoelectric. On FIG. 15 bottom we show the maximum difference between both measurements. Table 6 shows the values of different parameters of the measurements of FIG. 15.

TABLE 5

Fitting parameters and Goodness of fit

| Parameters | Reference | SMI-LV |
| --- | --- | --- |
| a | 68.94 | 73.38 |
| b | 1699 | 1761 |

TABLE 5-continued

Fitting parameters and Goodness of fit

| Parameters | Reference | SMI-LV |
|---|---|---|
| c | 2.666 | 3.159 |
| RMSE | 11.39 | 10.73 |

TABLE 6

Fitting parameters and Goodness of fit

| Parameters | Value |
|---|---|
| Peak to peak ref (pp) | 137.5 nm |
| Peak to peak SMI-LV (pp) | 139.0 nm |
| Error (pp) | 1.5 nm ($\lambda$/500) |
| Resolution (without fitting) | 36.92 nm ($\lambda$/20) |
| Resolution (with fitting) | 1.0953 nm ($\lambda$/625) |

As seen from Eq. (18), the displacement is measured in steps of ratio of time difference between vibration fringes and modulation fringes to time difference between consecutive modulation fringes e.g. $R = t_{mm}^{n-1}/t_{mr}^{n-1}$. Maximum resolution of proposed sensor SMI-LV rmax is the minimum step size that can be measure while measuring peak to peak target displacement of (137.52 nm) and is given by:

$$r_{max} = \min[\text{diff}(A_{t,rec})], \quad (41)$$

where $\text{diff}(A) = (a_2-a_1; a_3-a_2; \ldots; a_n-a_{n-1})$ provided that data points at the transitions are ignored.

Advantages and Disadvantages of the Method and System of the Present Invention

Both embodiments, that of FIG. 3 (amplitude modulation) and that of FIG. 10 (current modulation) of the method and system of the present invention, are suitable for the measurement of displacements smaller than $\lambda/2$, however the elements needed for the application and the limits of each technique induce limitations and advantages.

In the case of the amplitude modulation DSMI the advantages include:

Faster pre-processing and post processing than DSMI procedures formerly described in [6].
SMI signals always have the same number of fringes (which cannot always be satisfied in the DSMI method of [6], since the acquisition limit may lose one or more fringes due to wavelength and feedback factor differences).
Reference displacement can be estimated from the feeding of the piezoelectric, thus reducing the amount of pre-processed signals.
Single electronic conditioning board and acquisition board are required.
Reference signal can be pre-stored in memory and pre-processed.
It is possible to reduce some of the errors in the ramp changes for triangular signals if the stage is sufficiently characterized
Easier implementation of coding for transitions.
Lower requirements in the acquisition card.

and the following disadvantages:

Generally limited to triangular or ramp like motions. Sinusoidal or other kind may be used if a variable sampling rate satisfies the measured displacement.
Generally limited to low frequencies (0-10 kHz) due to limitations on mechanical displacements. Frequencies up to 20 kHz may be taken but under-sampling effects will appear on the reconstruction.
Higher influence of the linearity of the reference displacement stage.

Finally, the current modulation presents these advantages and disadvantages:

Suitable for frequency ranges within the amplification and feeding system (in theory up to the MHz scale).
Subjected to possible variations due to heating at high frequencies.
It is possible to perform an absolute distance measurement and at the same time the displacement measurement.
Reference signal may be pre-stored in memory.
Single electronic system and elements required.
Does not depend on mechanical motion.
Electronic card more complex than on amplitude modulation DSMI due to the high frequency requirements.
Pre-processing and post processing faster than classic DSMI of [6] and in the same order as d DSMI (in simulation).
Single channel requirements increase the number of ADC devices capable of detection in high frequency.

Based on the above presented results, it can be stated that the amplitude modulation embodiment method and the current modulation embodiment are better solutions, in comparison to [6], in order to build and implement practical applications. Also it is important to notice that the amplitude modulation embodiment method is suitable for the application with nearly non-reflective materials such as AFM cantilever tips, thus making it possible to apply the method as a sensor for other scientific instruments where space plays an important role.

Finally, two simple process implementations of, respectively, each of the presented main embodiments of the method of the first aspect of the invention are next given, showing that the method can be reduced into the following steps:

Mechanical Modulation Embodiment Implementation:
1. Start the laser in the mechanical modulation embodiment configuration.
2. Start the mechanical modulation (triangular displacement with maximum length of 100 μm) resulting on the SMI signal denoted as Sr. The number of fringes can be modified by changing the total travel of the mechanical modulation.
3. Record Sr and save it in memory.
4. While keeping the mechanical modulation, excite the target to produce the displacement on a scale lower than $\lambda/2$ that is being studied.
5. Record Sm.
6. Repeat the previous two steps as necessary, the previous Sm should not be over written.
7. Detect the fringe position of Sr.
8. Detect the fringe position of all the acquired Sm.
9. Compare the positions of all the Sm signals with Sr as described by the DSMI amplitude algorithm as it is shown in Eq. (10) to Eq. (20).
10. Reconstruct the target displacement.

Electronic (i.e. Current) Modulation Embodiment Implementation:
1. Start the laser in the current modulation embodiment configuration.
2. Start the electronic modulation resulting on the SMI signal denoted as Sr. Adjust the distance to the target to produce the desired number of fringes.
3. Record Sr and save it in memory.

4. While keeping the electronic modulation, excite the target to produce the displacement on a scale lower than $\lambda/2$ that is being studied.
5. Record Sm.
6. Repeat the previous two steps as necessary, the previous Sm should not be over written.
7. Detect the fringe position of Sr.
8. Detect the fringe position of all the acquired Sm.
9. Compare the positions of all the Sm signals with Sr as described by the DSMI amplitude algorithm as it is shown in Eq. (30) to Eq. (34).
10. Reconstruct the target displacement.

A person skilled in the art could introduce changes and modifications in the embodiments described without departing from the scope of the invention as it is defined in the attached claims.

The invention claimed is:

1. A method of measuring a change in an optical path length using differential laser self-mixing interferometry, the method comprising the steps of:
   obtaining a reference self-mixing interferometric signal (Sr) of a laser (LD) having a laser cavity;
   obtaining a main measurement self-mixing interferometric signal (Sm) of said laser (LD), once backscattered laser light (br) has re-entered said laser cavity, said backscattered laser light (br) being generated from the reflection on a target (T) of a main measurement laser light beam (be) emitted by said laser (LD) while is being modulated according to a specific modulation pattern; and
   determining the relative change in the optical path length between said laser (LD) and said target (T) comprised in a range between 0 and $\lambda/2$, by comparing the relative positions along time of fringes or transitions of said main (Sm) and reference (Sr) self-mixing interferometric signals;
   wherein the method is characterised in that said reference self-mixing interferometric signal (Sr) is obtained on said laser (LD) and at a different moment than said main measurement self-mixing interferometric signal (Sm) once backscattered laser light, generated from the reflection on said target (T) of a reference laser light beam (be) emitted by said laser (LD) while maintaining said specific modulation pattern while both the main measurement self-mixing interferometric signal (Sm) and the reference self-mixing interferometric signal (Sr) are acquired, has re-entered said laser cavity.

2. The method of claim 1, wherein:
   said main measurement self-mixing interferometric signal (Sm) includes a defined number of fringes for a measurement time window, and said specific modulation pattern is maintained during said emission of said reference laser beam (be) such that the reference measurement self-mixing interferometric signal (Sr) includes, for a time window with the same duration than said measurement time window, the same defined number of fringes than the self-mixing interferometric signal (Sm) but, at least some of them, shifted with respect thereto, and
   wherein said comparison of the relative positions of the fringes or transitions of the main (Sm) and reference (Sr) self-mixing interferometric signals includes at least a comparison between the positions, in their respective time windows, of at least some of the fringes of both of said main (Sm) and reference (Sr) self-mixing interferometric signals.

3. The method of claim 1, wherein said relative change of optical path length is due to a random displacement perturbance of said target (T) and/or to a change in the refractive index of the optical path.

4. The method of claim 1, wherein said measuring of a change in said optical path length is performed for measuring a displacement-related parameter containing length, frequency and directional attributes, and wherein said optical path length relative change is determined in the form of relative motion and/or relative velocity of said target (T) with respect to said laser (LD).

5. The method of claim 2, wherein said modulation is a mechanical amplitude modulation provided by applying a specific and controlled relative physical displacement, where displacement is to be understood as the act of displacing, between said laser (LD) and said target (T) to produce said specific modulation pattern.

6. The method of claim 5, where said defined number of fringes are proportional to the amplitude of the mechanical amplitude modulation, the latter being larger than $\lambda/2$.

7. The method of claim 6, wherein said relative physical displacement of said mechanical amplitude modulation is performed along a time extent following a ramp-like or triangular path.

8. The method of claim 7, wherein said change in the optical path length is a displacement-related parameter constituted by or associated to relative motion and/or relative velocity of said target (T) which is undergoing said random displacement perturbance when obtaining the main measurement self-mixing interferometric signal (Sm).

9. The method of claim 2, wherein said modulation is a current modulation which comprises providing to said laser (LD) a driving current signal which is modulated in time to produce said specific modulation pattern.

10. The method of claim 9, where said defined number of fringes are a function of the absolute distance to the target (T), where said absolute distance to the target (T) is larger than the resolution of the current modulation, said modulation also comprising, if needed, adjusting said absolute distance to the target (T) to produce said defined number of fringes.

11. The method of claim 10, wherein said driving current signal is a current signal modulated in time as a triangular wave, and said displacement-related parameter is said random displacement perturbance suffered by the target (T).

12. The method of any of claim 1, wherein said main (Sm) and reference (Sr) self-mixing interferometric signals are optical output power signals, or signals generated therefrom or related thereto.

13. The method of claim 1, wherein said main measurement self-mixing interferometric signal (Sm) is a first main measurement self-mixing interferometric signal (Sm), the method comprising, after obtaining said first main measurement self-mixing interferometric signal (Sm):
   obtaining at least a second main measurement self-mixing interferometric signal including the same defined number of fringes for a second measurement time window with the same duration than said measurement time window, and
   performing said determining of the relative change in the optical path length between said laser (LD) and said target (T), by comparing the positions, in their respective time windows, of at least some of the fringes of all of the main self-mixing interferometric signals with at least some of the fringes of the reference (Sr) self-mixing interferometric signal.

14. A differential laser self-mixing interferometry measuring system comprising:
- a laser (LD) having a laser cavity and arranged for emitting a main measurement light beam (be) onto a target (T), while is being modulated according to a specific modulation pattern, and for receiving, re-entering said laser cavity, backscattered laser light (br) generated from the reflection on said target (T) of said main measurement laser light beam (be);
- detection means (Dm) arranged for detecting a main measurement self-mixing interferometric signal (Sm) of said laser (LD) resulting from the re-entering of said backscattered laser light (br) into the laser cavity;
- means for obtaining a reference self-mixing interferometric signal (Sr); and
- measuring means (M) for determining the relative change in the optical path length between said laser (LD) and said target (T) comprised in a range between 0 and $\lambda/2$, by comparing the relative positions along time of fringes or transitions of said main (Sm) and reference (Sr) interferometric signals;

wherein the system is characterised in that said means for obtaining said reference self-mixing interferometric signal (Sr) are constituted by said detection means (Dm), which are configured and arranged for detecting said reference (Sr) self-mixing interferometric signal on said laser (LD) and at a different moment than said main measurement self-mixing interferometric signal (Sm) once backscattered laser light, generated from the reflection on said target (T) of a reference laser light beam (be) emitted by said laser (LD) while maintaining said specific modulation pattern, has re-entered said laser cavity.

15. The system of claim 14, wherein said measuring means (M) are intended for determining said optical path length relative change in the form of relative motion and/or relative velocity of said target (T) with respect to said laser (LD)), and wherein said laser (LD) is the only laser included in the system.

16. The system of claim 14, wherein said modulation means are configured and arranged for maintaining said specific modulation pattern during the obtaining, by means of the detection means (Dm), of both the main measurement (Sm) and the reference (Sr) self-mixing interferometric signals, such that both of said signals include the same defined number of fringes during respective time windows; and said modulation means comprise displacement means for performing a mechanical amplitude modulation by applying a specific relative physical displacement between said laser (LD) and said target (T), where displacement is to be understood as the act of displacing, and control means controlling said laser (LD) to make it emit said reference and said measurement laser light beam onto said target (T) while said specific relative physical displacement is maintained.

17. The system of claim 16, wherein said displacement means comprise a moveable support (S) onto which the laser (LD) is mounted, the system further comprising a driving mechanism including at least one electrically excited vibrating element fixed or at least in contact with said support (S), and electronic means supplying said vibrating element with electrical signals predetermined for making it vibrate according to said specific relative physical displacement (V) performed along a time extent following a ramp-like or triangular path.

18. The system of claim 16, wherein said modulation means comprise driving current means (Em) for providing to said laser (LD) a driving current signal which is modulated in time to produce said specific modulation pattern.

19. The system of claim 18, wherein said modulation means also comprises distance adjusting means for adjusting the absolute distance to the target (T) to produce said defined number of fringes.

20. The system of claim 14, comprising memory means for storing said reference (Sr) and measurement (Sm) self-mixing interferometric signals, said memory means being accessible by said measuring means (M).

* * * * *